US007715713B1

(12) United States Patent
Iyer et al.

(10) Patent No.: US 7,715,713 B1
(45) Date of Patent: May 11, 2010

(54) METHOD AND APPARATUS FOR PROVIDING MULTIPLE OPTICAL CHANNEL PROTECTION SWITCHING MECHANISMS IN OPTICAL RINGS

(75) Inventors: Ravichandran Iyer, Freehold, NJ (US); Manjunath Sampangi, San Jose, CA (US); Antonio Rodriguez-Moral, Madrid (ES); Paul Bonenfant, Ocean, NJ (US); Xiaowen Mang, Manalapan, NJ (US); Leah Zhang, Holmdel, NJ (US)

(73) Assignee: Meriton Networks US Inc., Wilmington, DE (US)

( * ) Notice: Subject to any disclaimer, the term of this patent is extended or adjusted under 35 U.S.C. 154(b) by 2020 days.

(21) Appl. No.: 10/373,594

(22) Filed: Feb. 25, 2003

Related U.S. Application Data

(63) Continuation of application No. 10/262,572, filed on Sep. 30, 2002, now abandoned.

(51) Int. Cl.
*H04J 14/00* (2006.01)
(52) U.S. Cl. .................. 398/58; 398/59; 398/5
(58) Field of Classification Search .............. 398/3–5, 398/58, 59, 222–228; 370/222–228
See application file for complete search history.

(56) References Cited

U.S. PATENT DOCUMENTS

| 4,965,790 | A | * | 10/1990 | Nishino et al. .............. 370/437 |
| 5,999,288 | A | | 12/1999 | Ellinas et al. ............... 359/119 |
| 6,721,502 | B1 | | 4/2004 | Al-Salameh et al. .......... 398/3 |
| 6,763,190 | B2 | | 7/2004 | Agrawal et al. ............... 398/5 |
| 6,970,417 | B1 | | 11/2005 | Doverspike et al. ......... 370/216 |
| 7,003,225 | B2 | * | 2/2006 | Iraschko et al. .............. 398/4 |
| 7,031,299 | B2 | | 4/2006 | Chaudhuri et al. .......... 370/352 |
| 7,058,012 | B1 | | 6/2006 | Chen et al. .................. 370/222 |
| 7,269,346 | B1 | | 9/2007 | Iyer et al. ...................... 398/3 |
| 7,277,631 | B1 | | 10/2007 | Iyer et al. ...................... 398/1 |
| 2002/0003639 | A1 | | 1/2002 | Arecco et al. ............... 359/119 |
| 2002/0138614 | A1 | | 9/2002 | Hall ........................... 709/225 |
| 2002/0145779 | A1 | * | 10/2002 | Strasser et al. .............. 359/124 |
| 2003/0020977 | A1 | | 1/2003 | Smith et al. .................. 359/110 |
| 2003/0169470 | A1 | * | 9/2003 | Alagar et al. ............... 359/110 |
| 2004/0057375 | A1 | * | 3/2004 | Shiragaki et al. ............ 370/216 |

OTHER PUBLICATIONS

GR-1230-Core, "Sonet BLSR Equipment Generic Criteria", Issue 4, Dec. 1998, Section 6.
S. Ramamurthy et al., "Survivable WDM Mesh Networks, Part II-Restoration", IEEE, 1999.

* cited by examiner

*Primary Examiner*—Dalzid Singh
(74) *Attorney, Agent, or Firm*—Mayer & Williams PC; Stuart H. Mayer; Karin L. Williams

(57) ABSTRACT

A technique for allocating protection-switching mechanisms operates on a per wavelength basis. This allows a designer of an optical network to select a particular protection switching mechanism for a given traffic type, which is usually specific to a particular wavelength in an optical network. For another traffic type, the designer can allocate a different protection switching mechanism, thereby providing optimal protection switching for each traffic type.

19 Claims, 45 Drawing Sheets

Mix and match protection on a per-channel basis allows diverse services

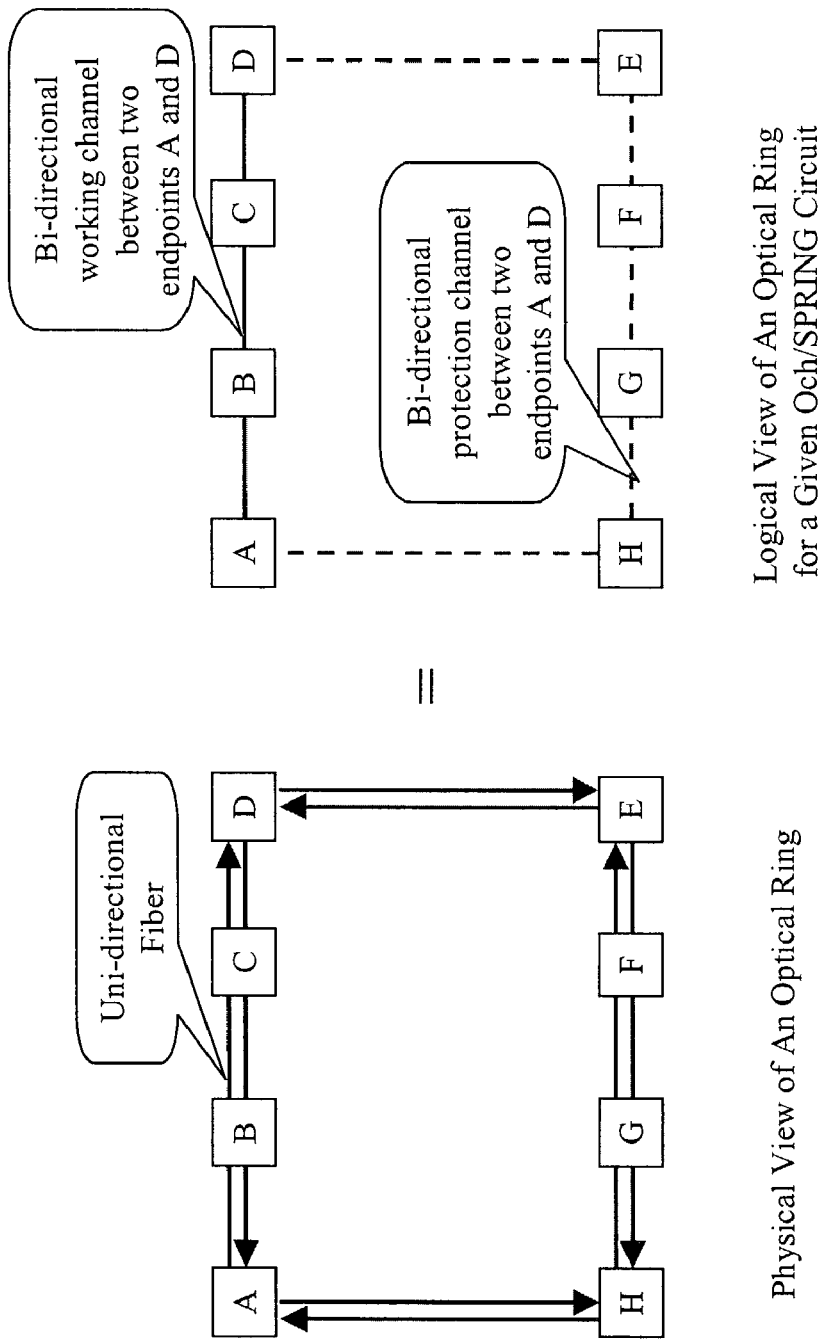
FIGs 1A-B – An Example of Optical Ring

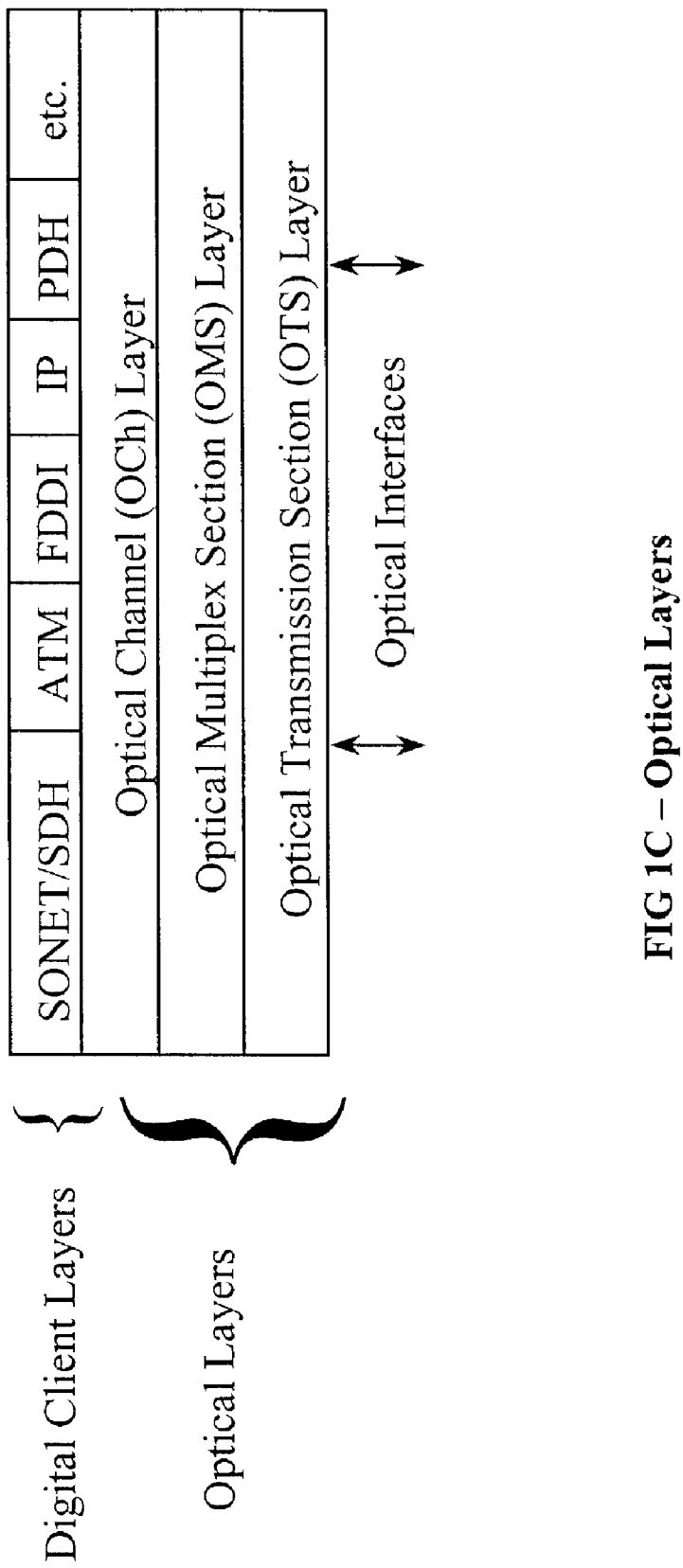
FIG 1C – Optical Layers

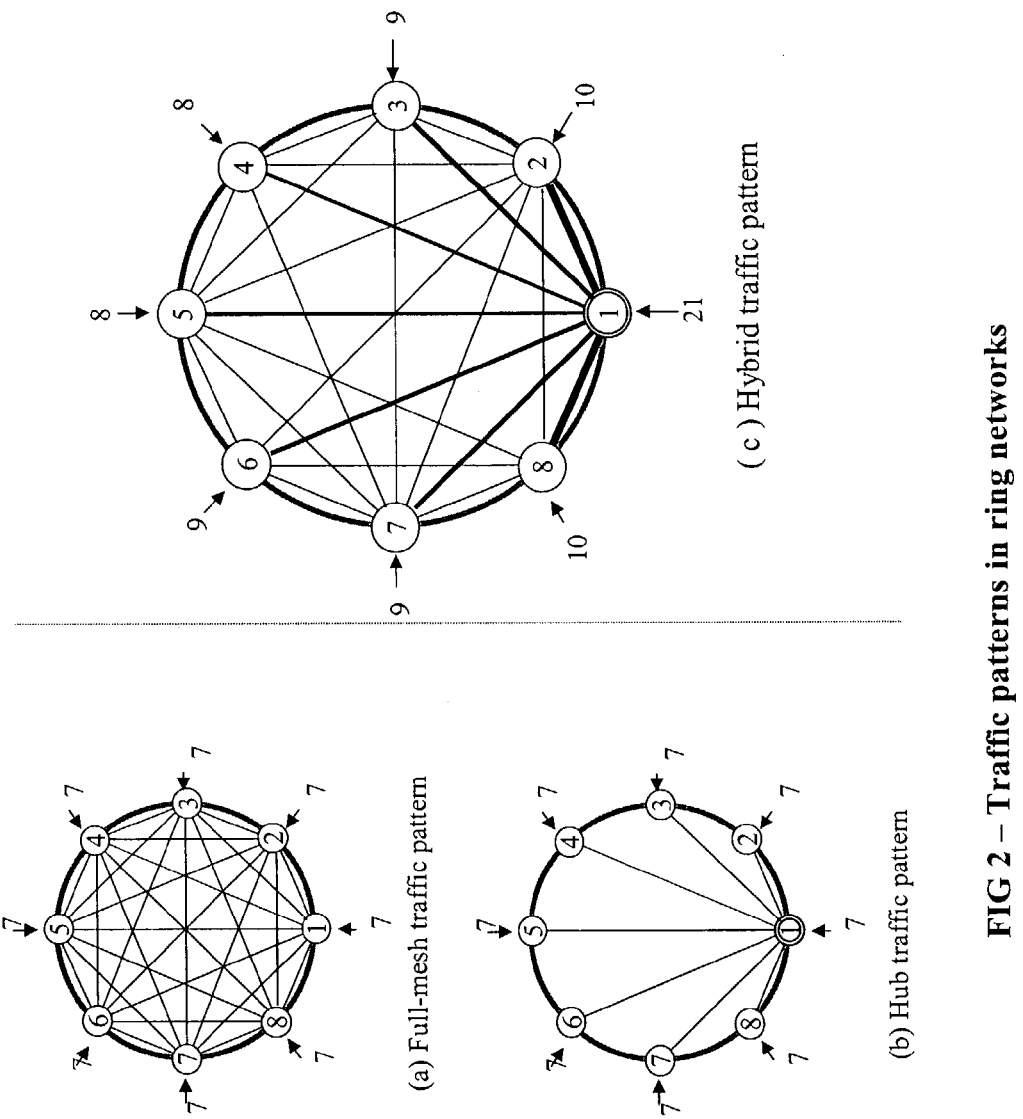
FIG 2 – Traffic patterns in ring networks

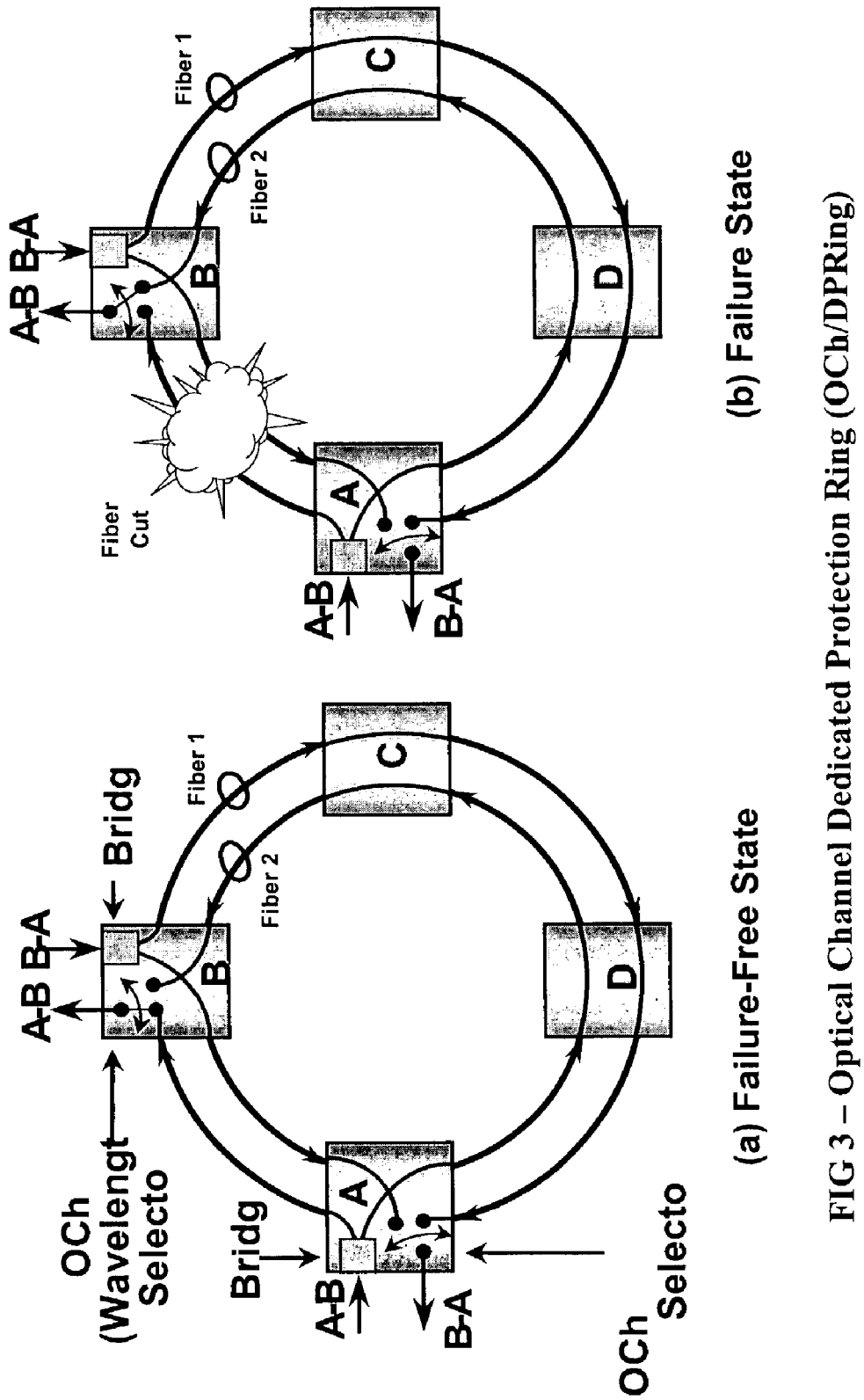
FIG 3 – Optical Channel Dedicated Protection Ring (OCh/DPRing)

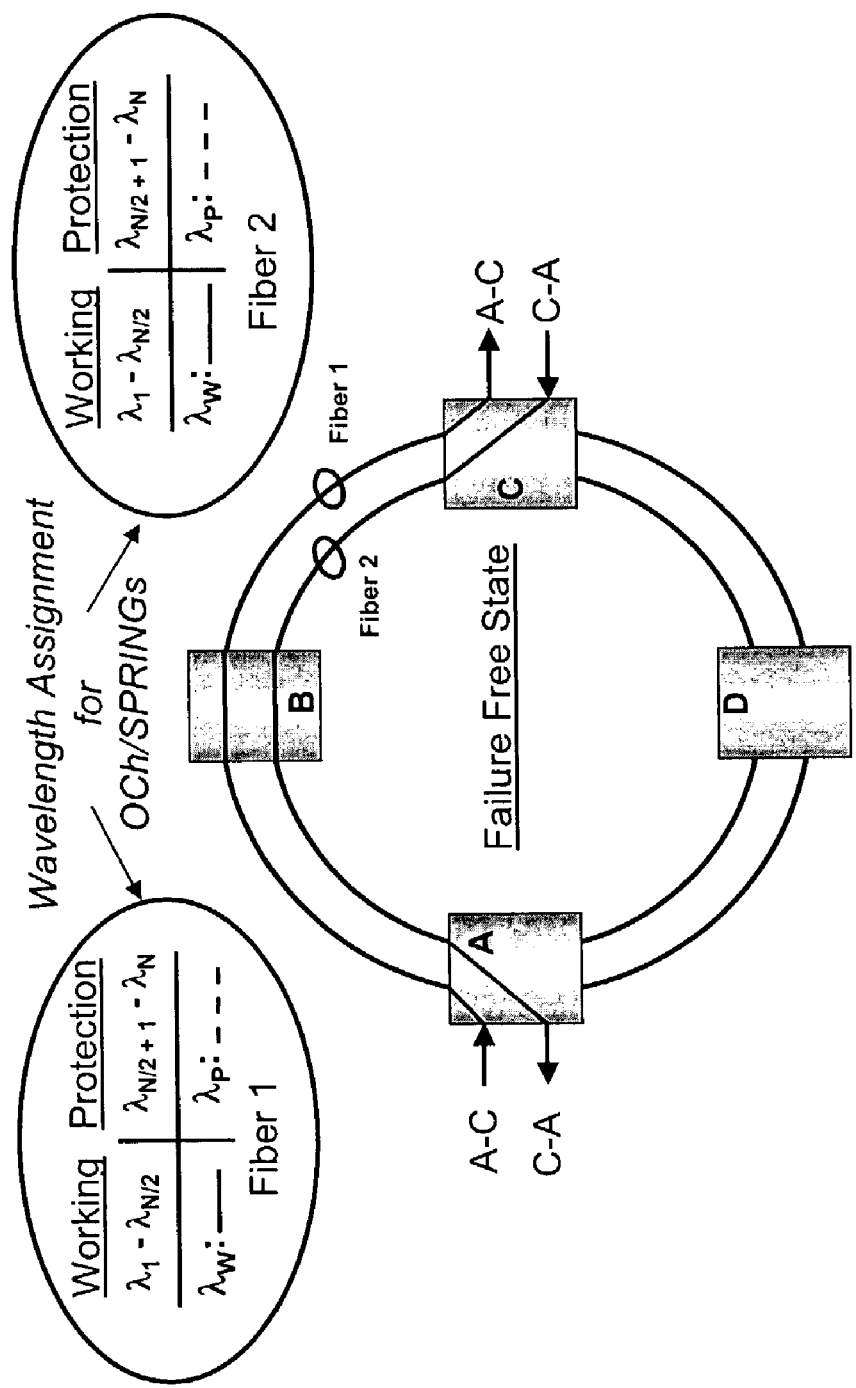
FIG 4A – OCh/SPRing: Failure-Free State

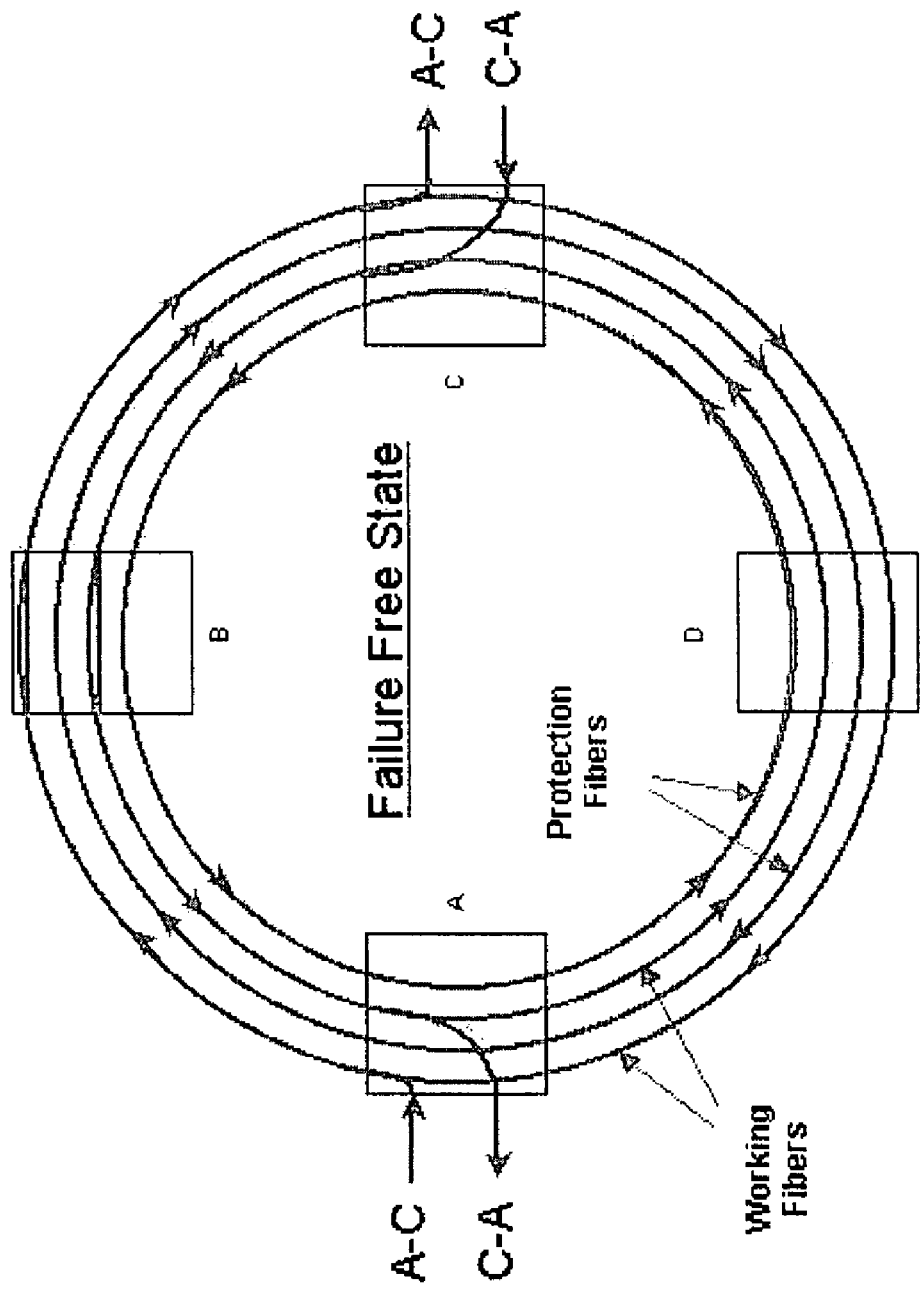
FIG 4B - Generic 4-Fiber SPRing - Failure-Free State

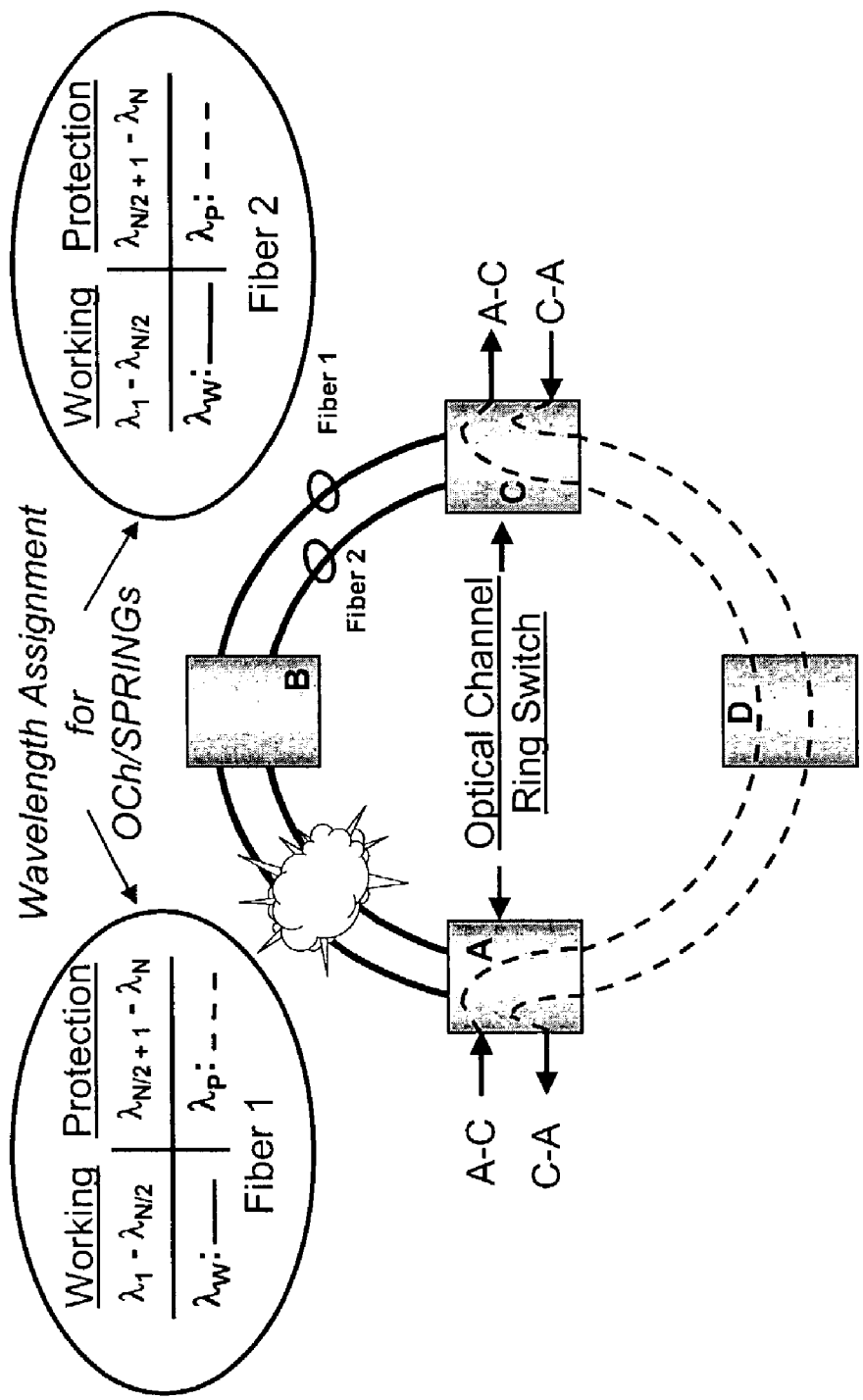
FIG 5A – OCh/SPRing: Failure State

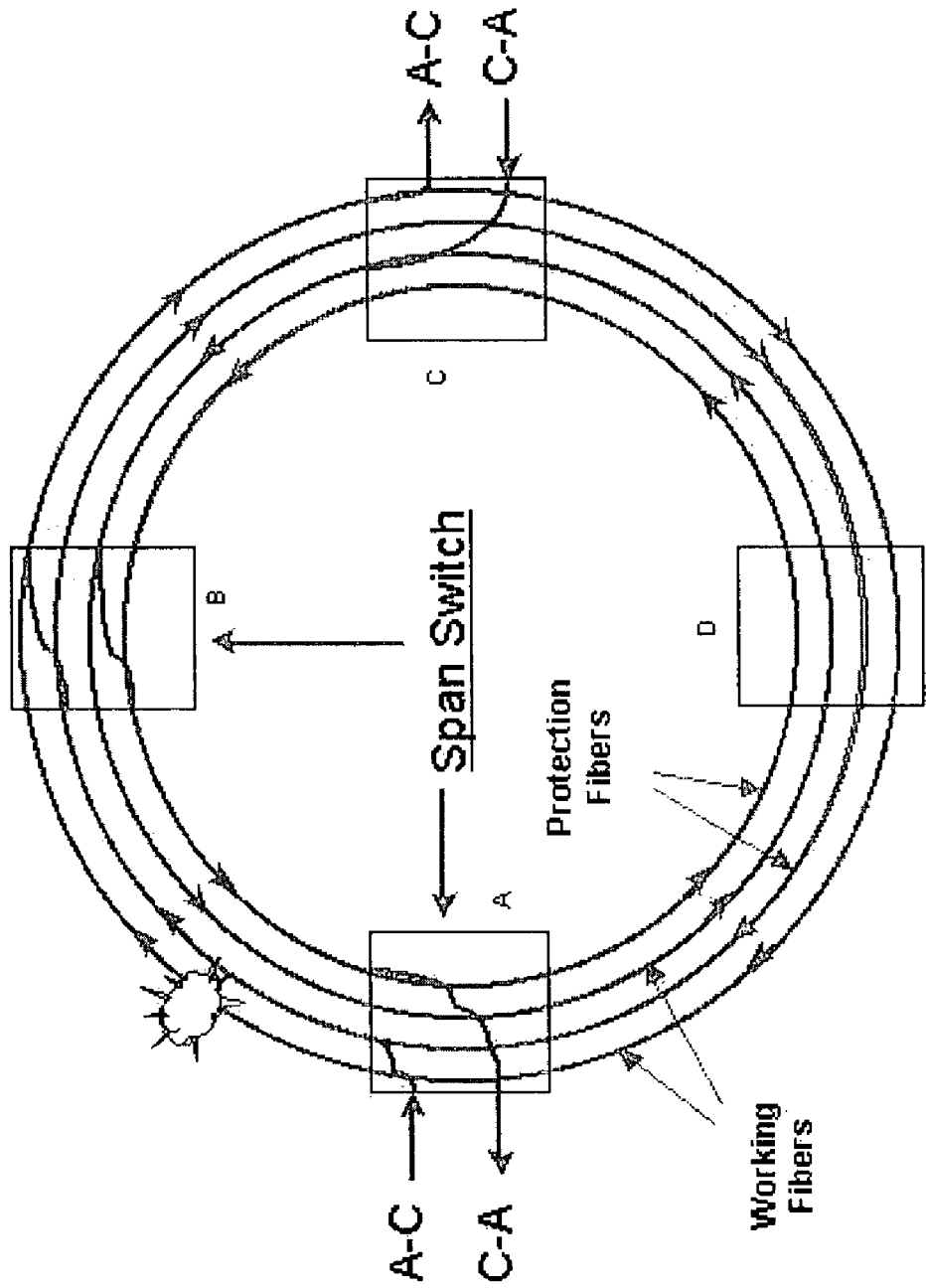
FIG 5B - Generic 4-Fiber SPRing - Span Switch

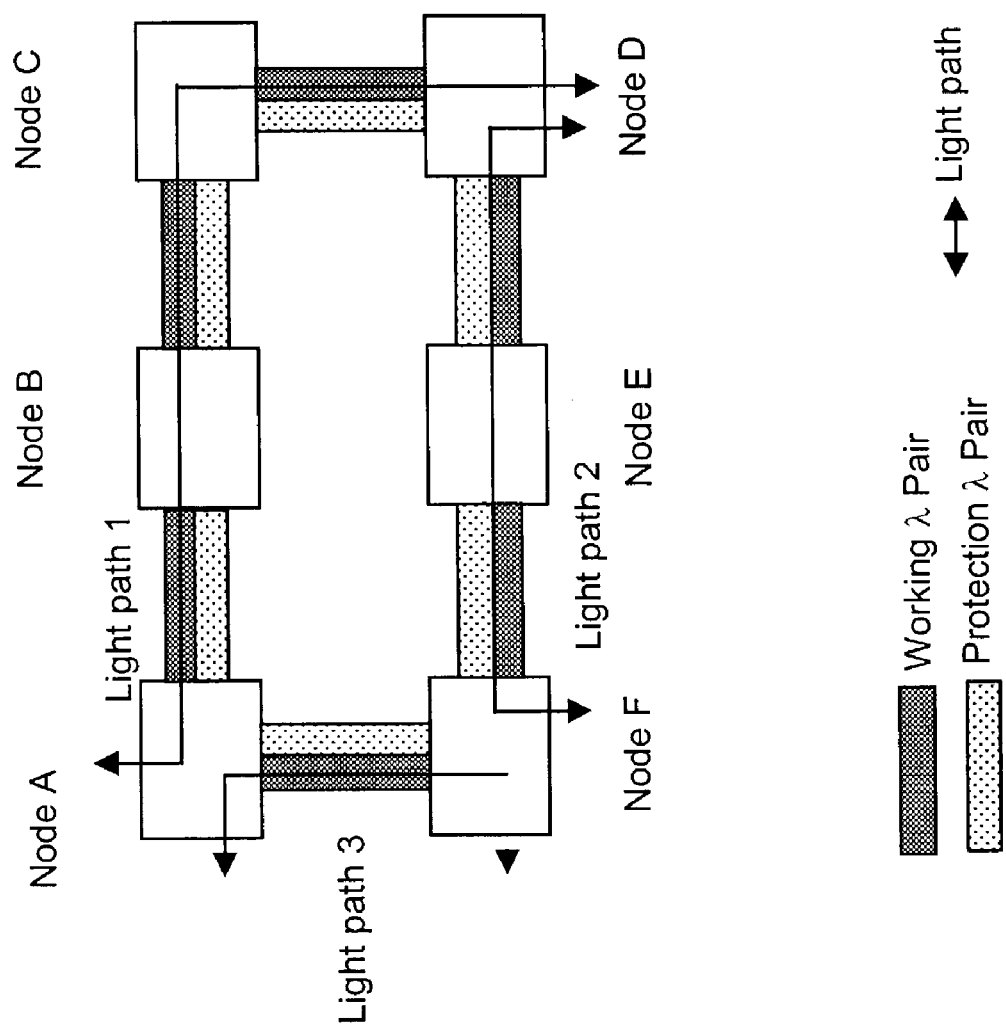
FIG 6A – OCh/SPRing: Normal (Fault-Free) State

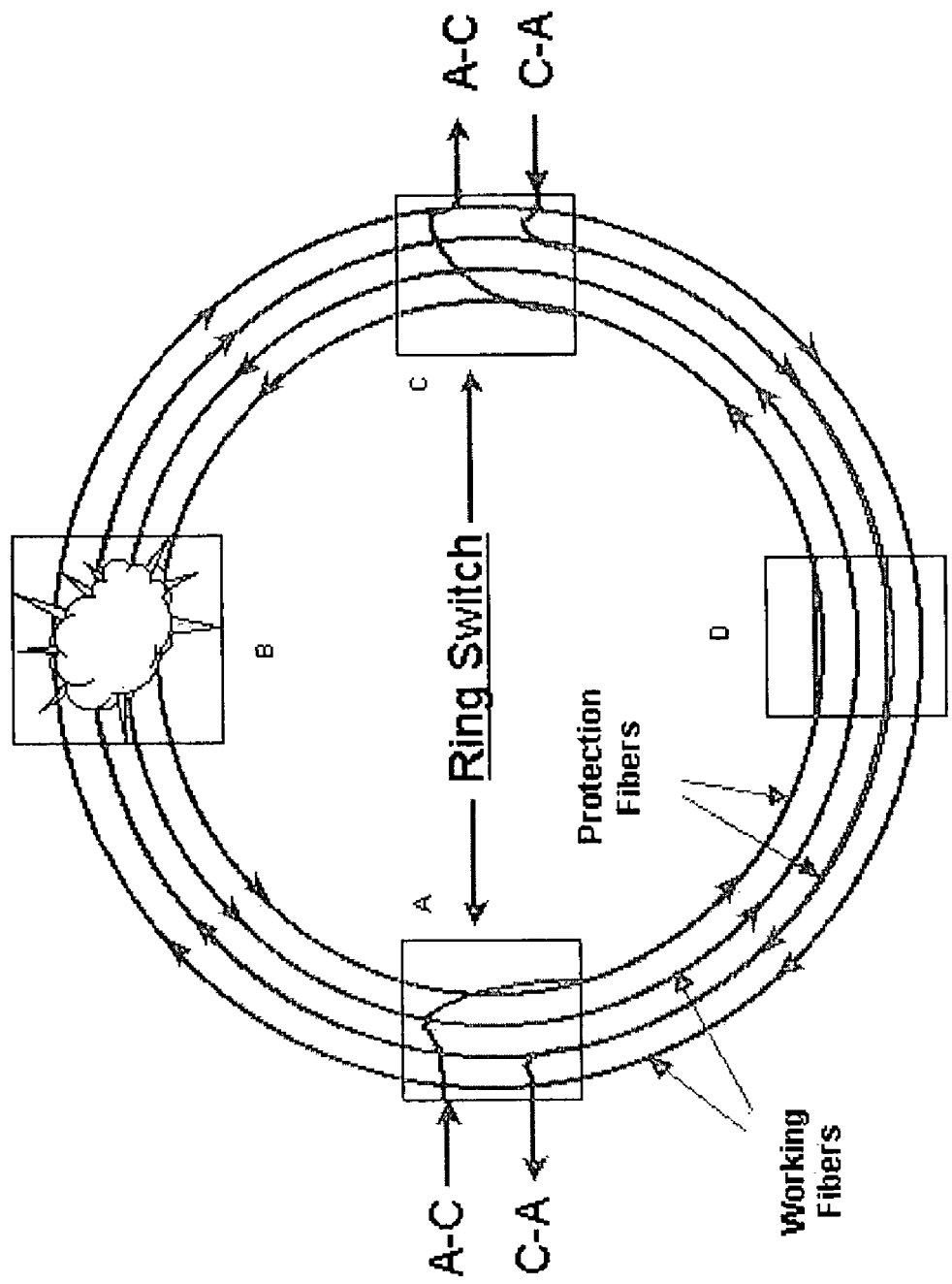
FIG 6B - Generic 4-Fiber SPRing Ring Switch

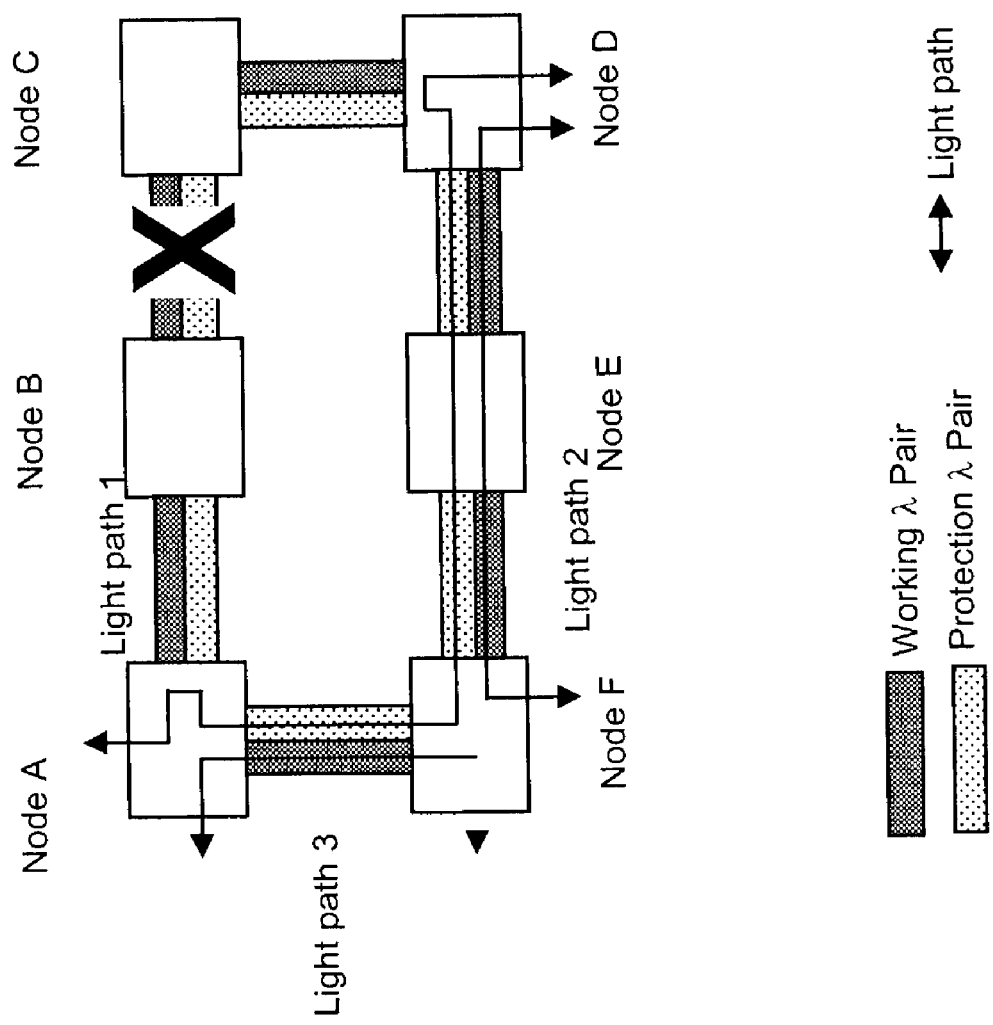
FIG 7 – OCh/SPRing: Failure State (Ring Switch)

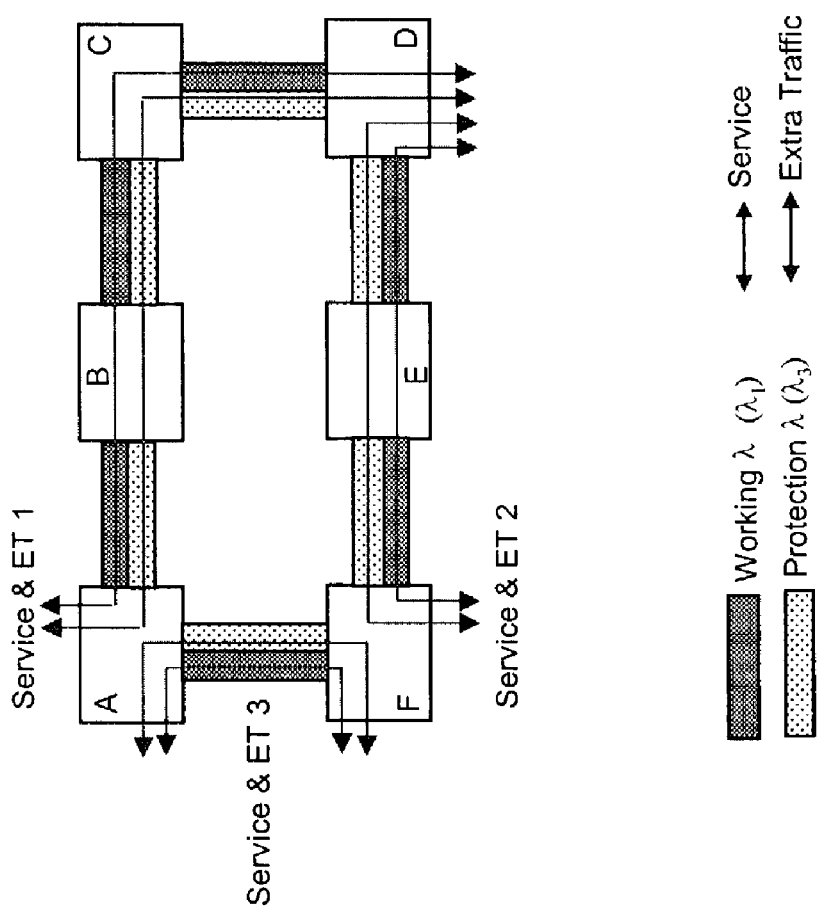
FIG 8 – OCh/SPRING with ET

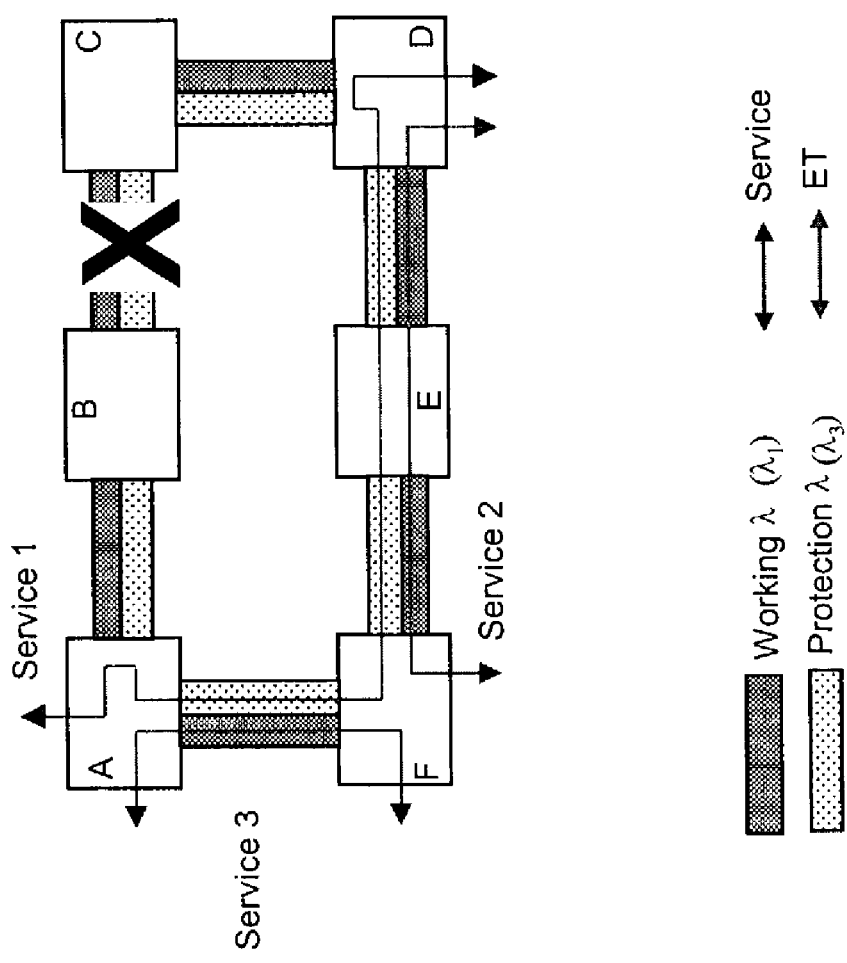
FIG 9 – OCh/SPRING with ET under Failure Condition

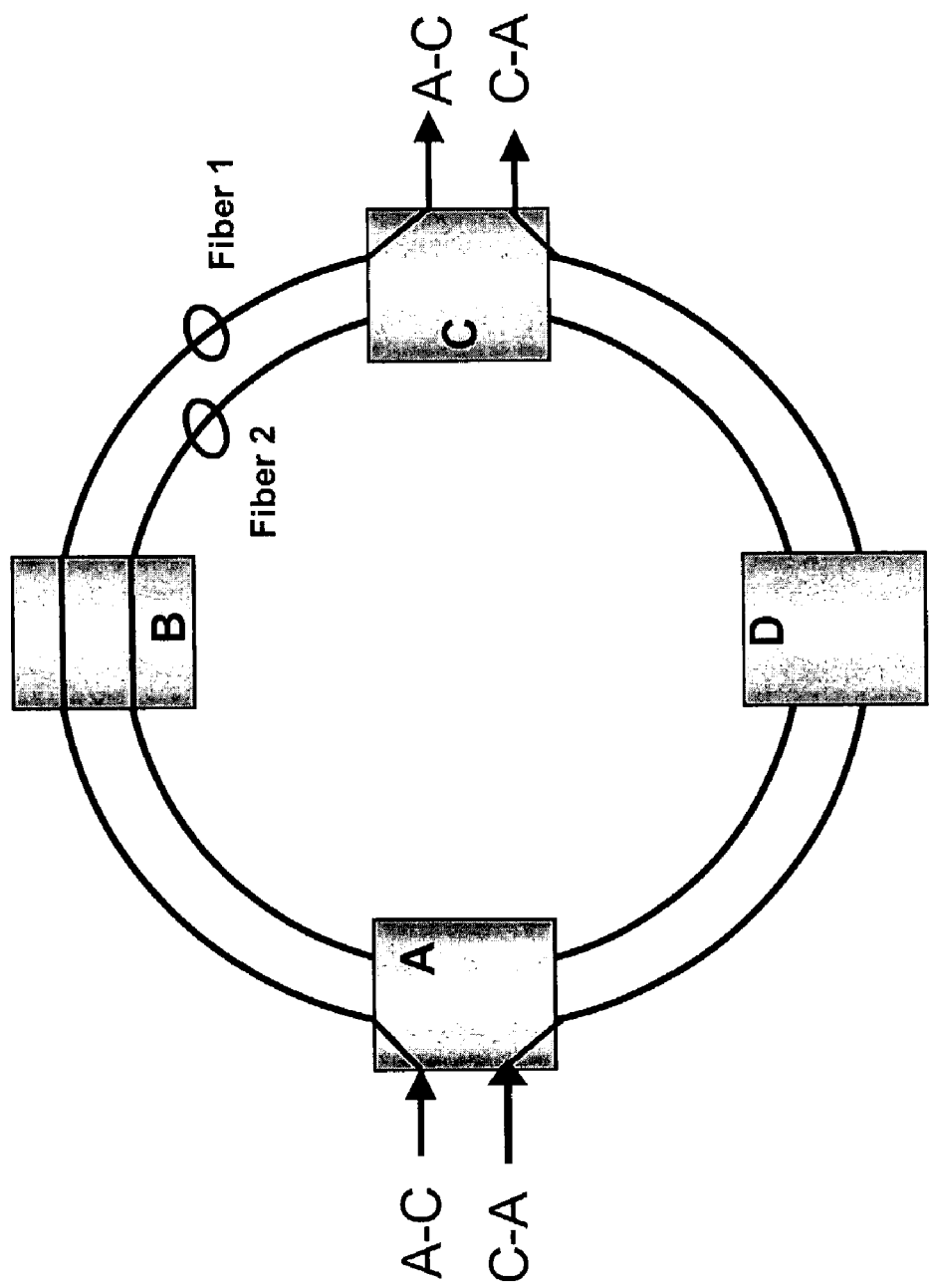
FIG 10 - Unprotected/Link-and-node Disjoint Paths

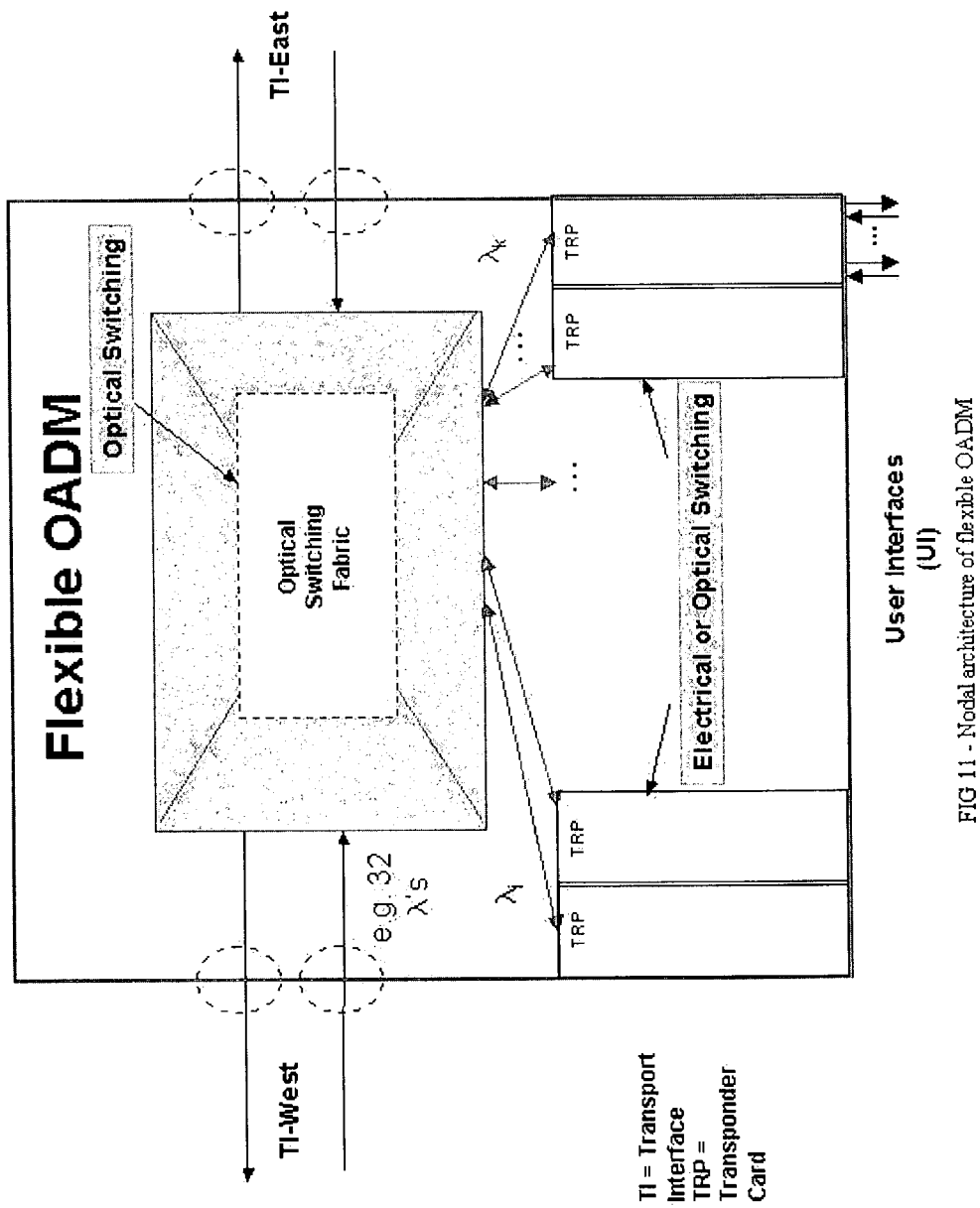
FIG 11 - Nodal architecture of flexible OADM

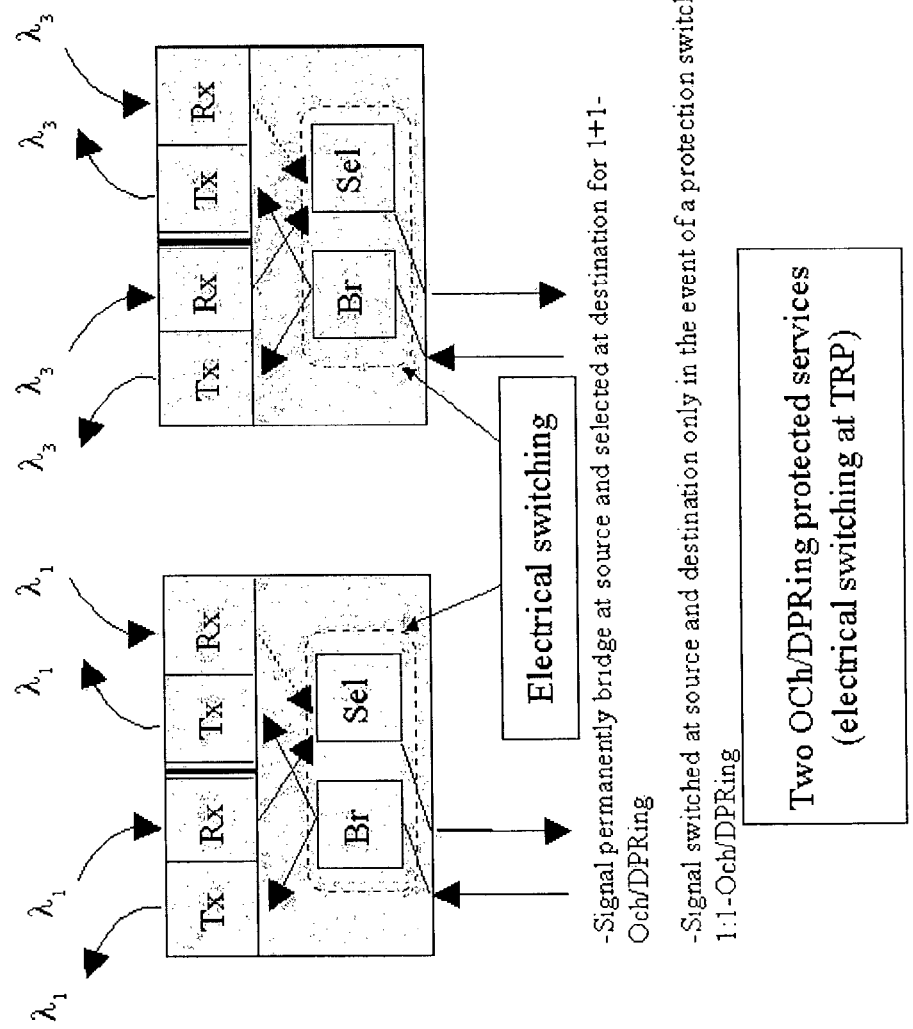
FIG 12A – TRP Configuration with Electrical Switching for Och/DPRing

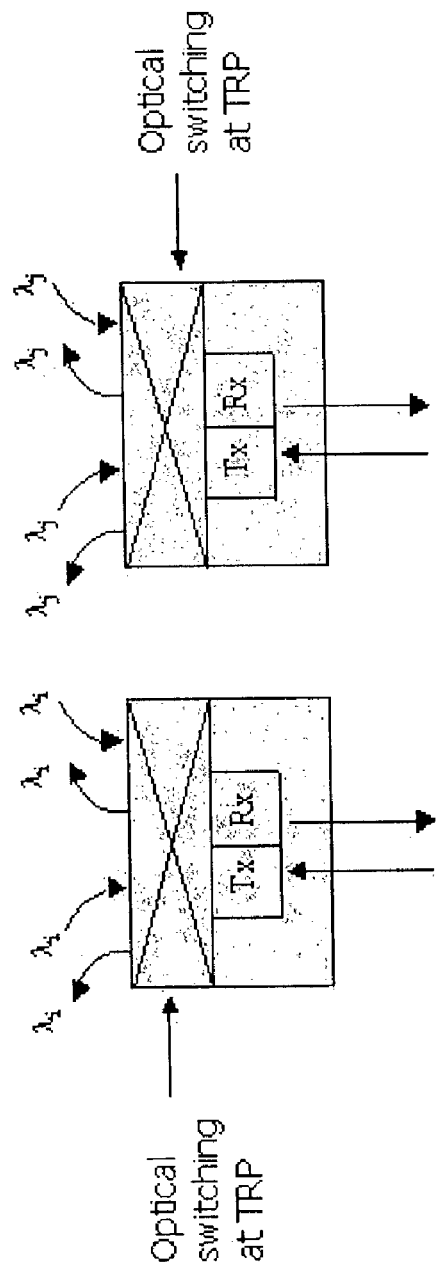
FIG 12B - TRP Configuration with optical switching for 1+1 or 1:1-OCh/DPRing
- optical bridge at the head-end and an optical switch at the tail end for 1+1 OCh/DPRing
- signal switched at source and destination only in the event of a protection switch for 1:1-Och/DPRing

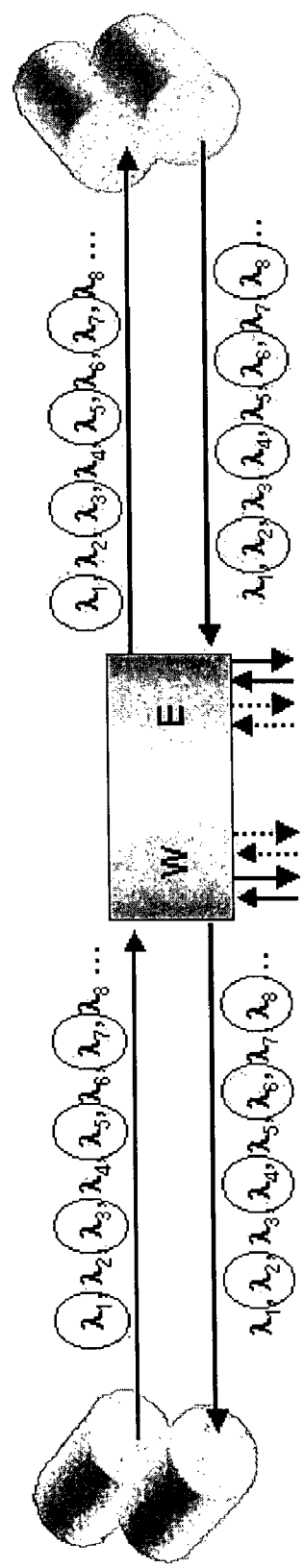
Figure 13 - Wavelength Configuration for OCh/SPRING

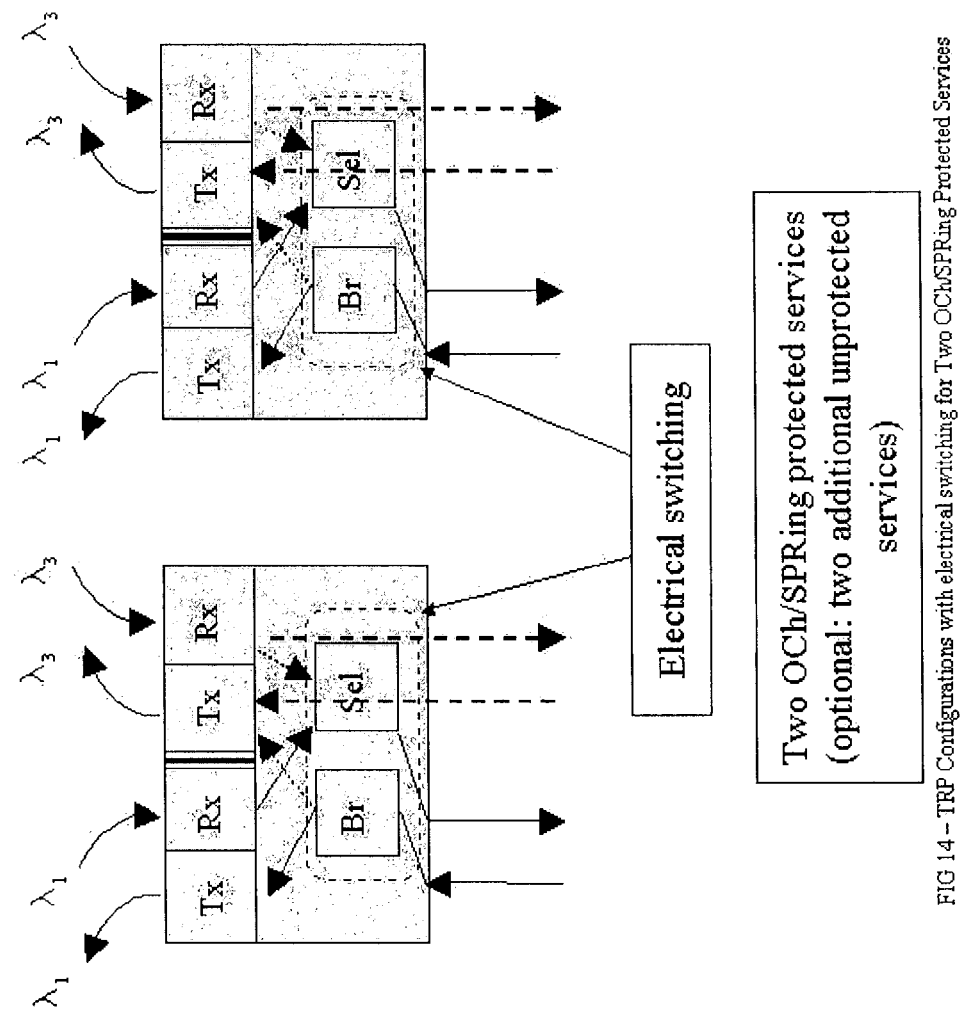
FIG 14A – TRP Configuration with Electrical Switching for Two OCh/SPRing Protected Services

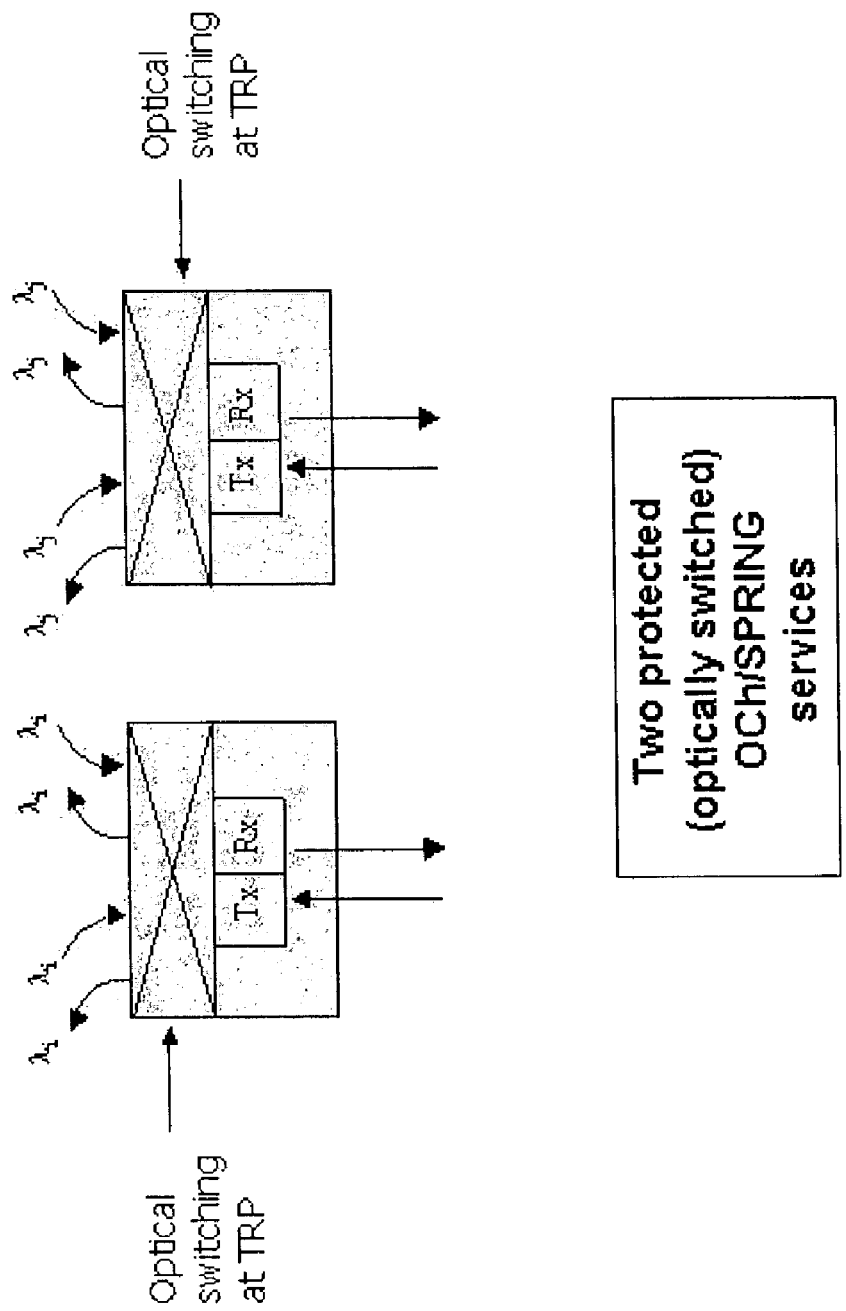
FIG 14B - TRP Configuration with optical switching for two OCh/SPRing protected services

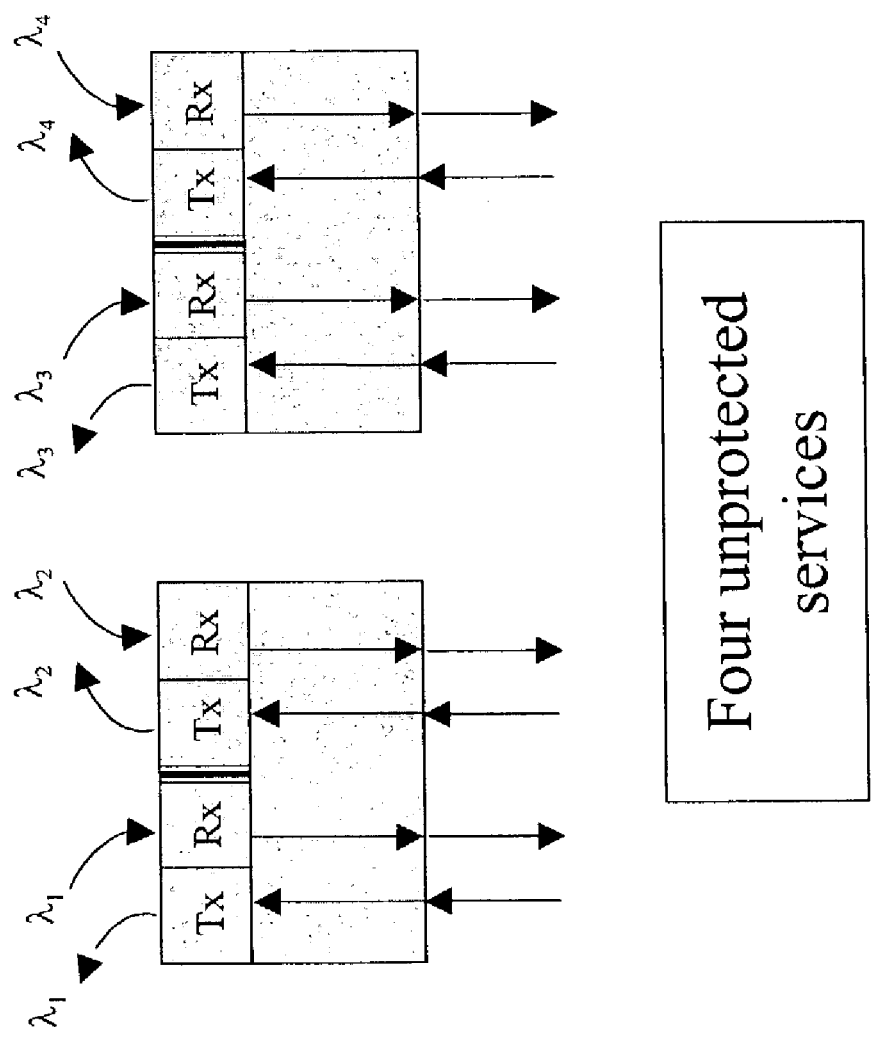
FIG 15 – TRP Configuration for Unprotected Services

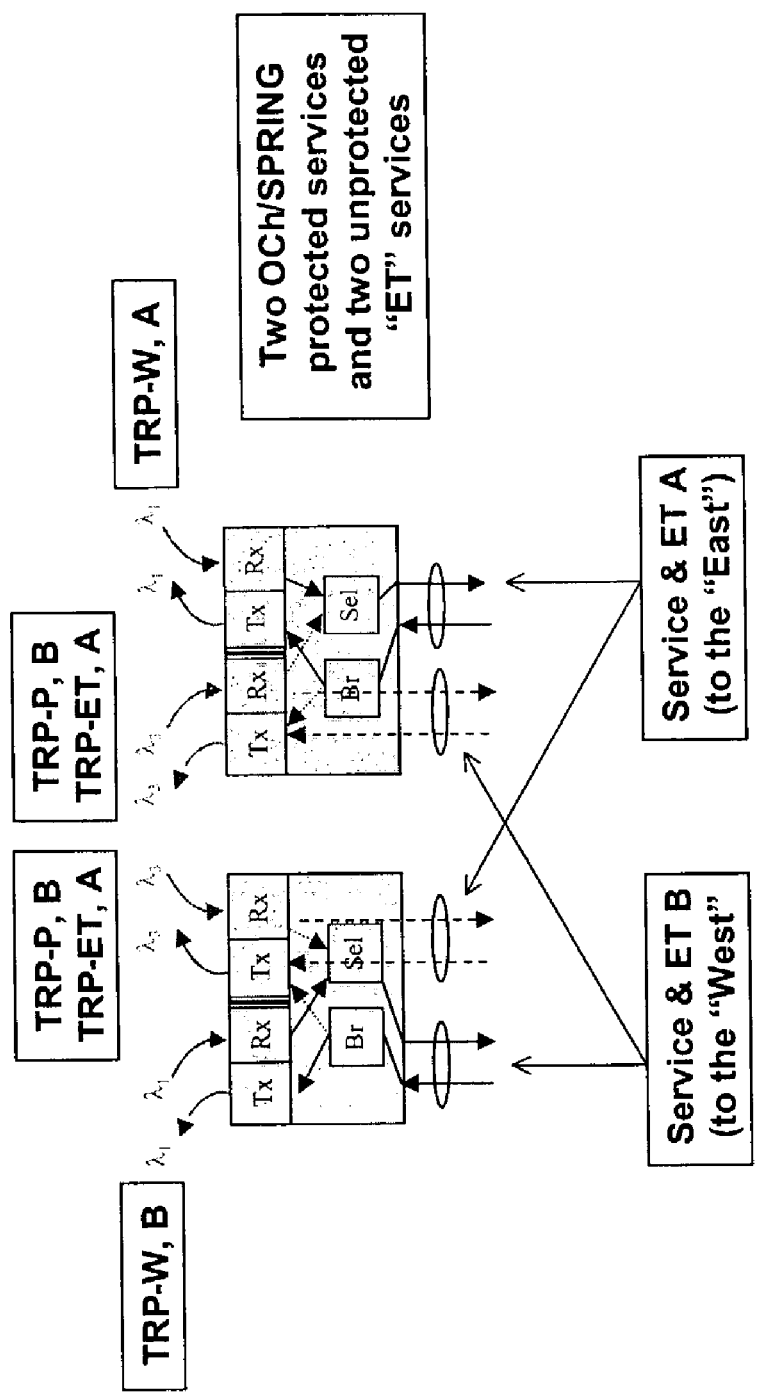
FIG 16 – TRP Configurations for OCh/SPRing and ET

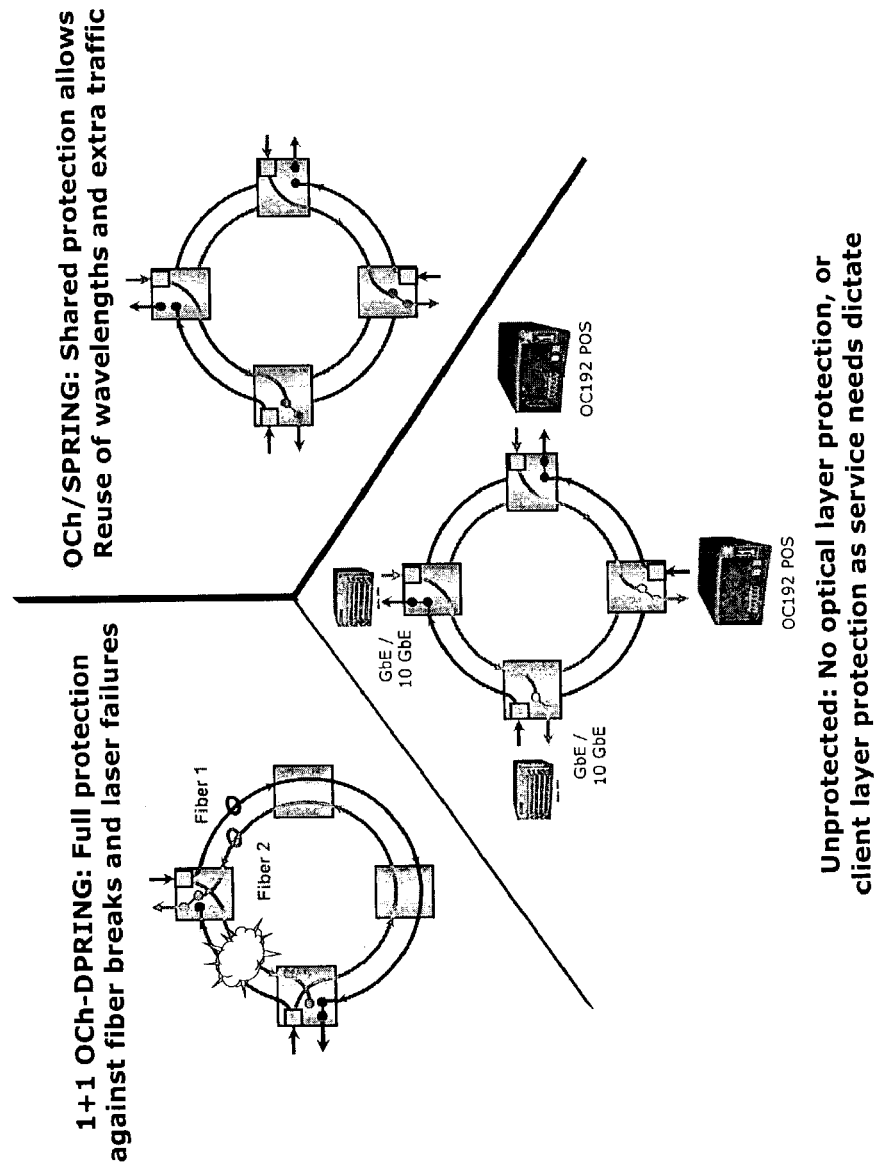
FIG 17 - Mix and match protection on a per-channel basis allows diverse services

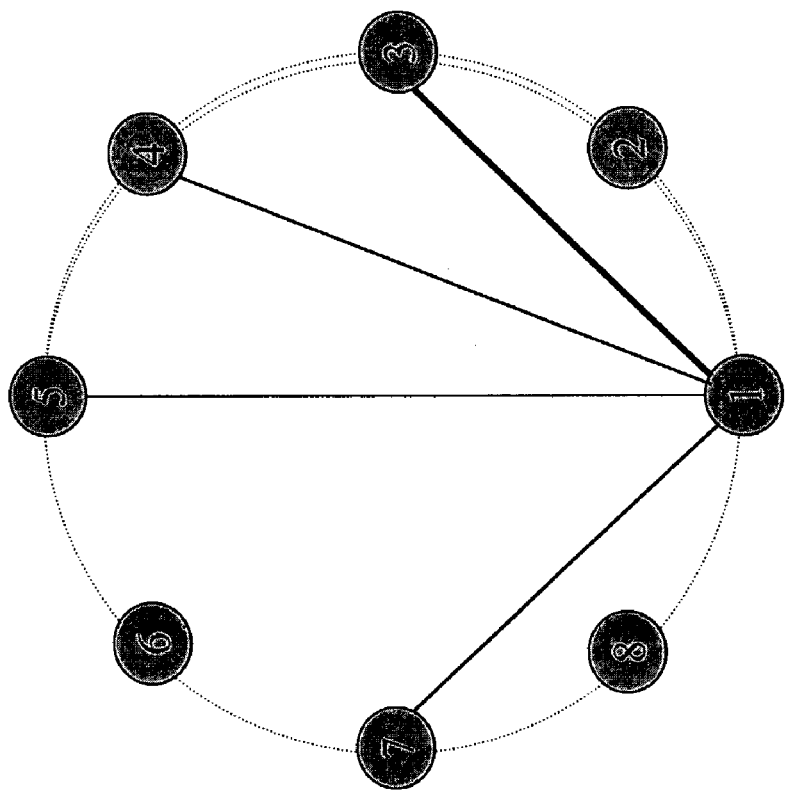
FIG 18 – Hubbed Traffic Demands

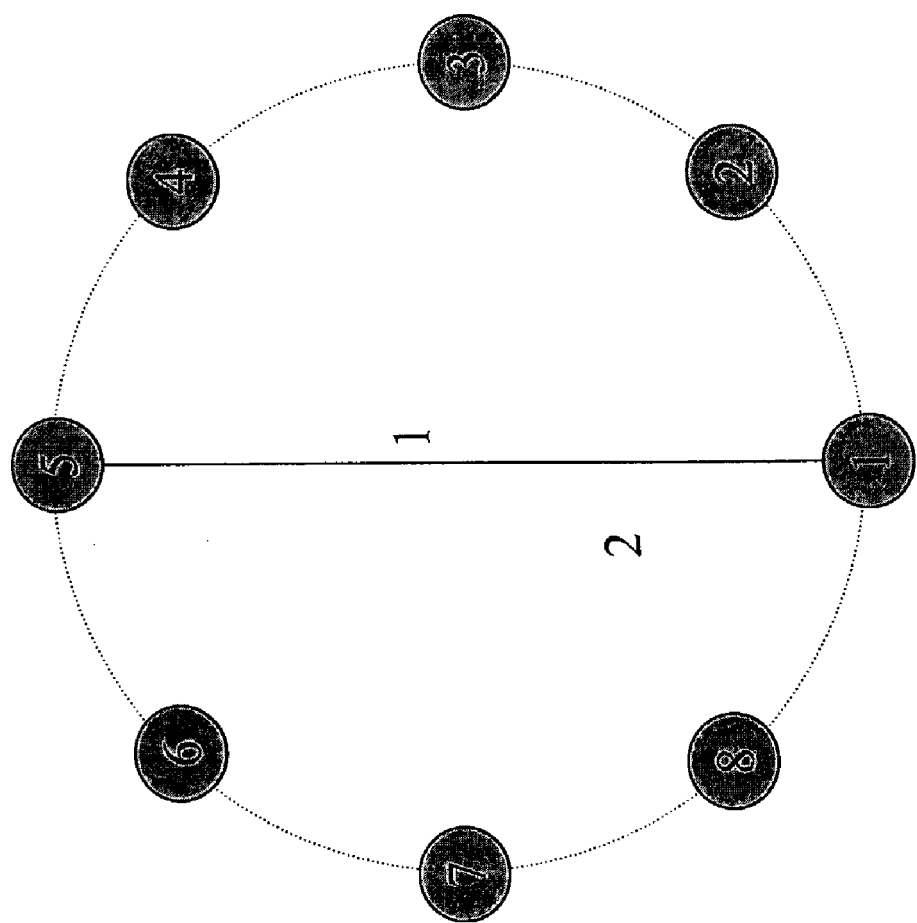
FIG 19 – Cross Traffic Demands

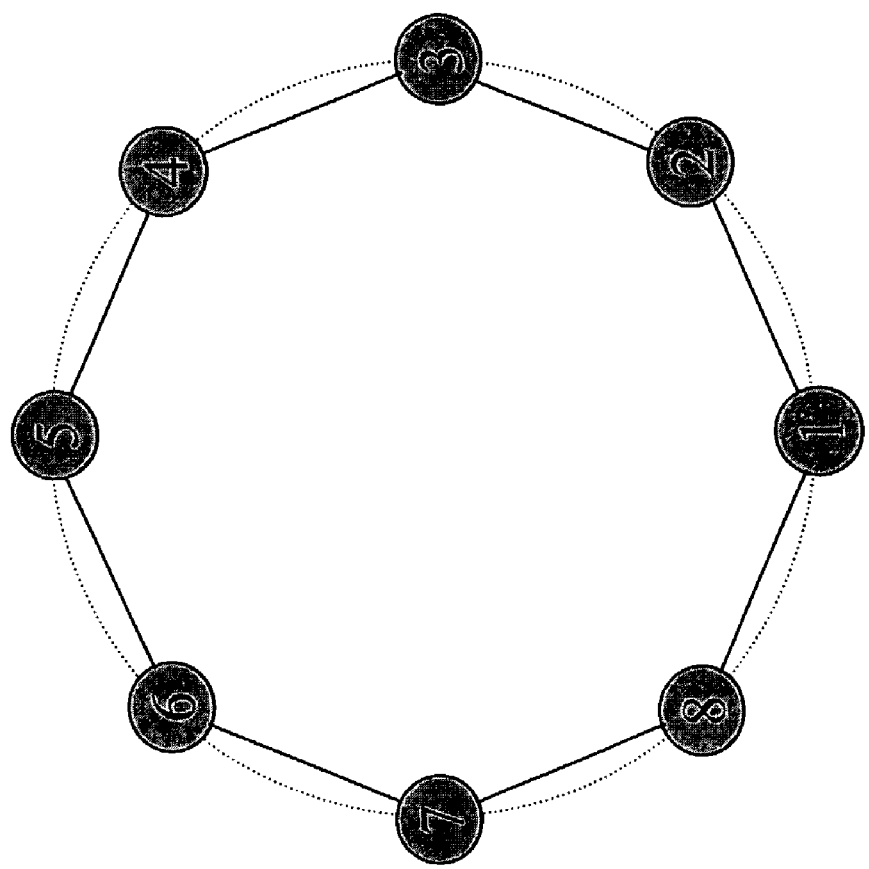
FIG 20 – Adjacent Traffic Demands

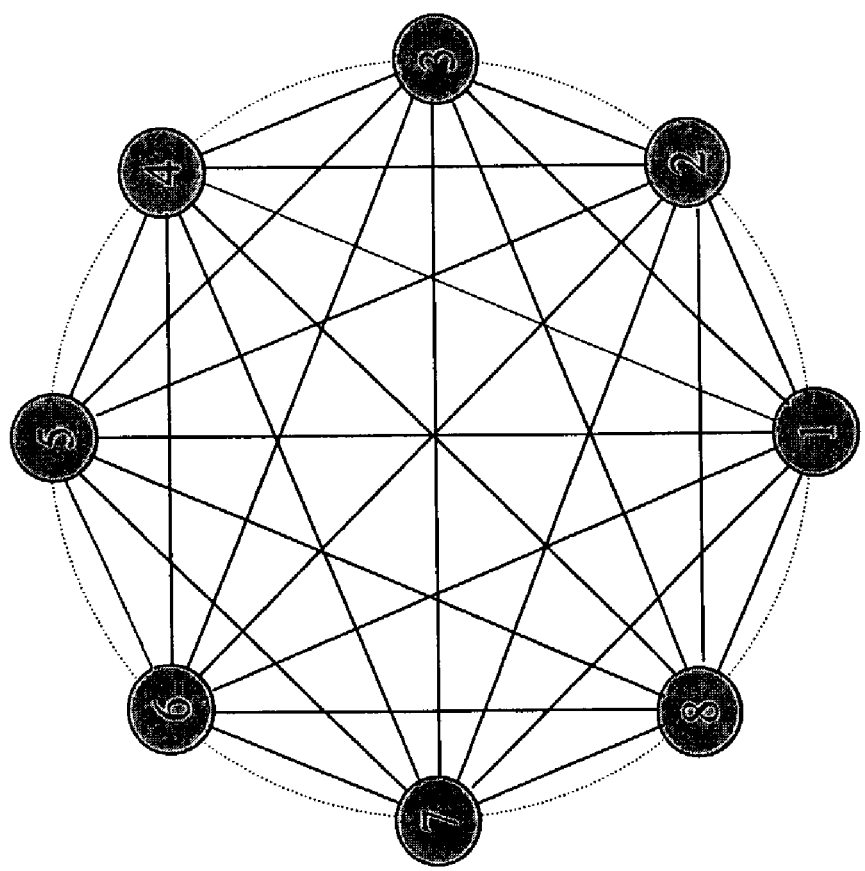
FIG 21 – Full Meshed Traffic Demands

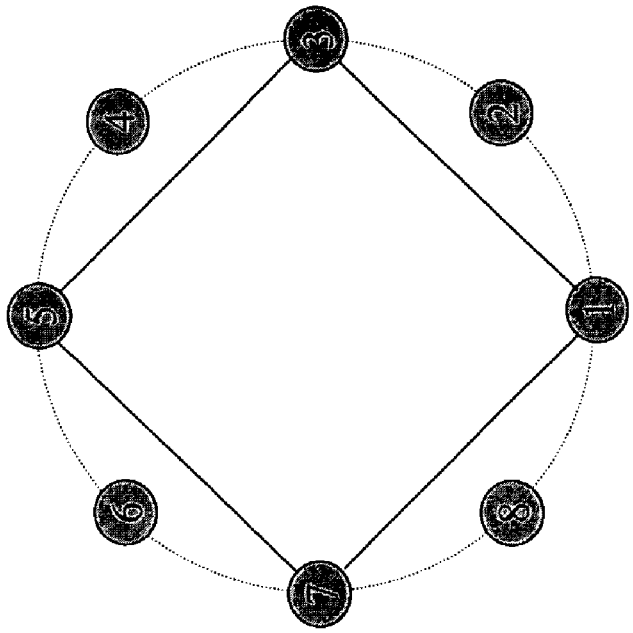
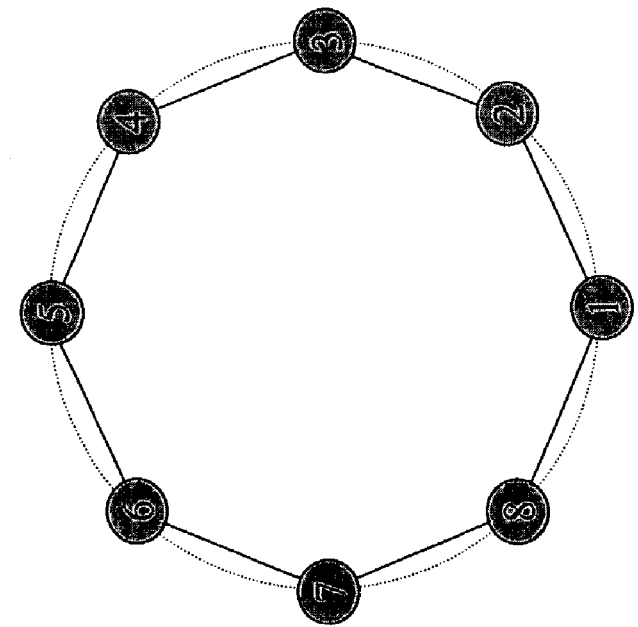
FIG 22 – Protection Group 1

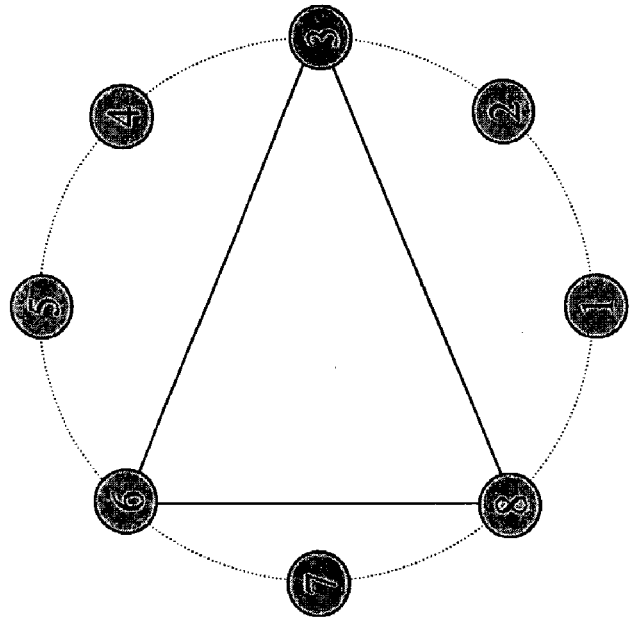
These 3 demand triangle share λ4
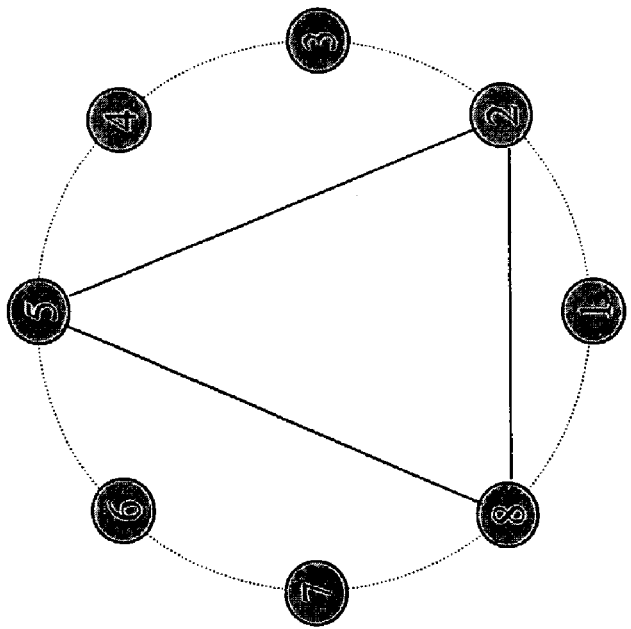
These 3 demand triangle share λ3
FIG 23 – Protection Group 2

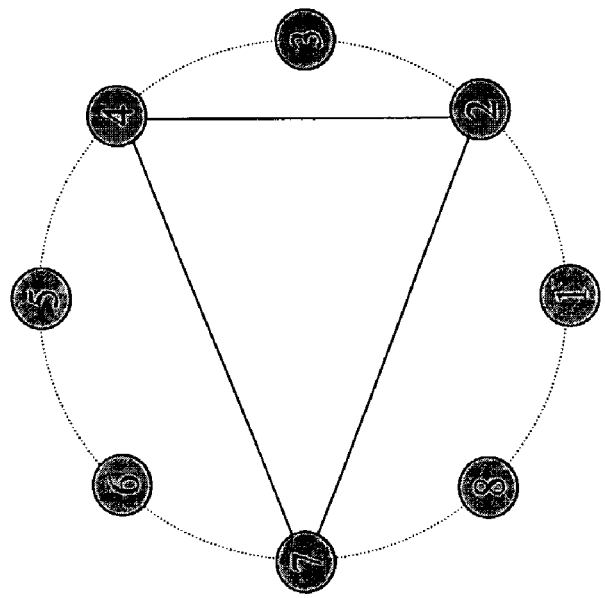
These 3 demand triangle share λ6
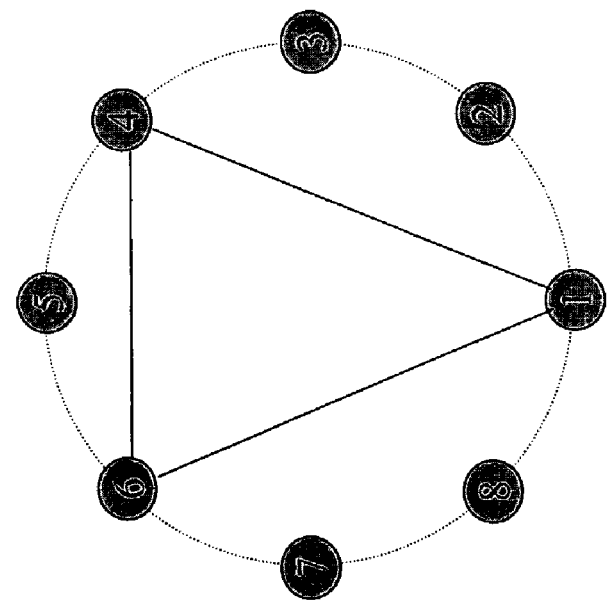
These 3 demand triangle share λ5
FIG 24 – Protection Group 3

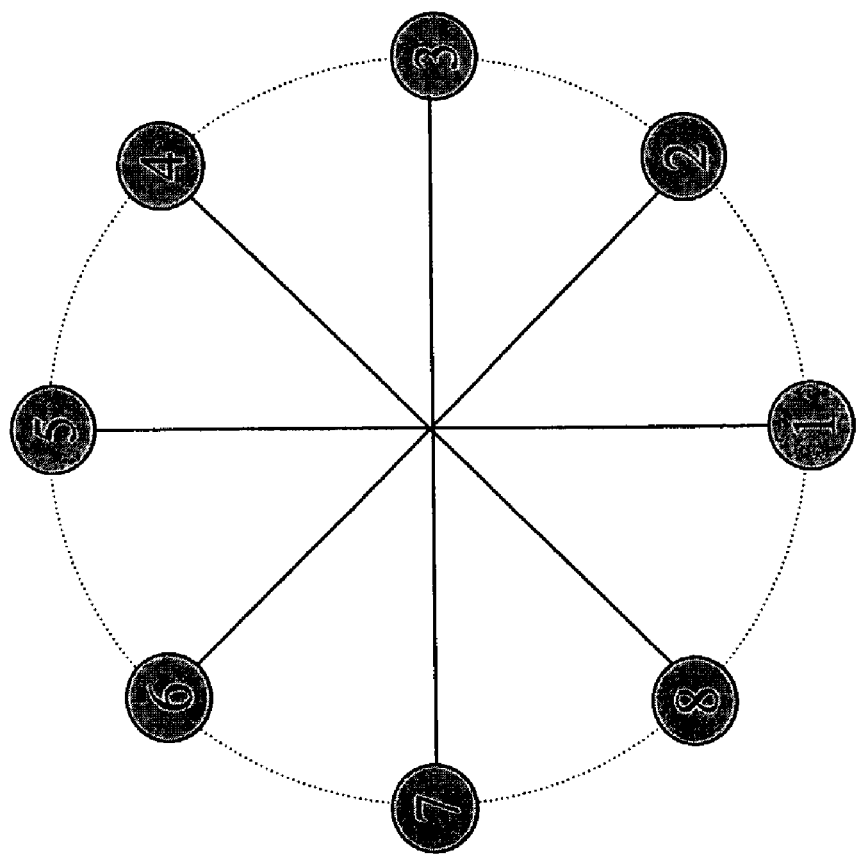
FIG 25 – Protection Group 4

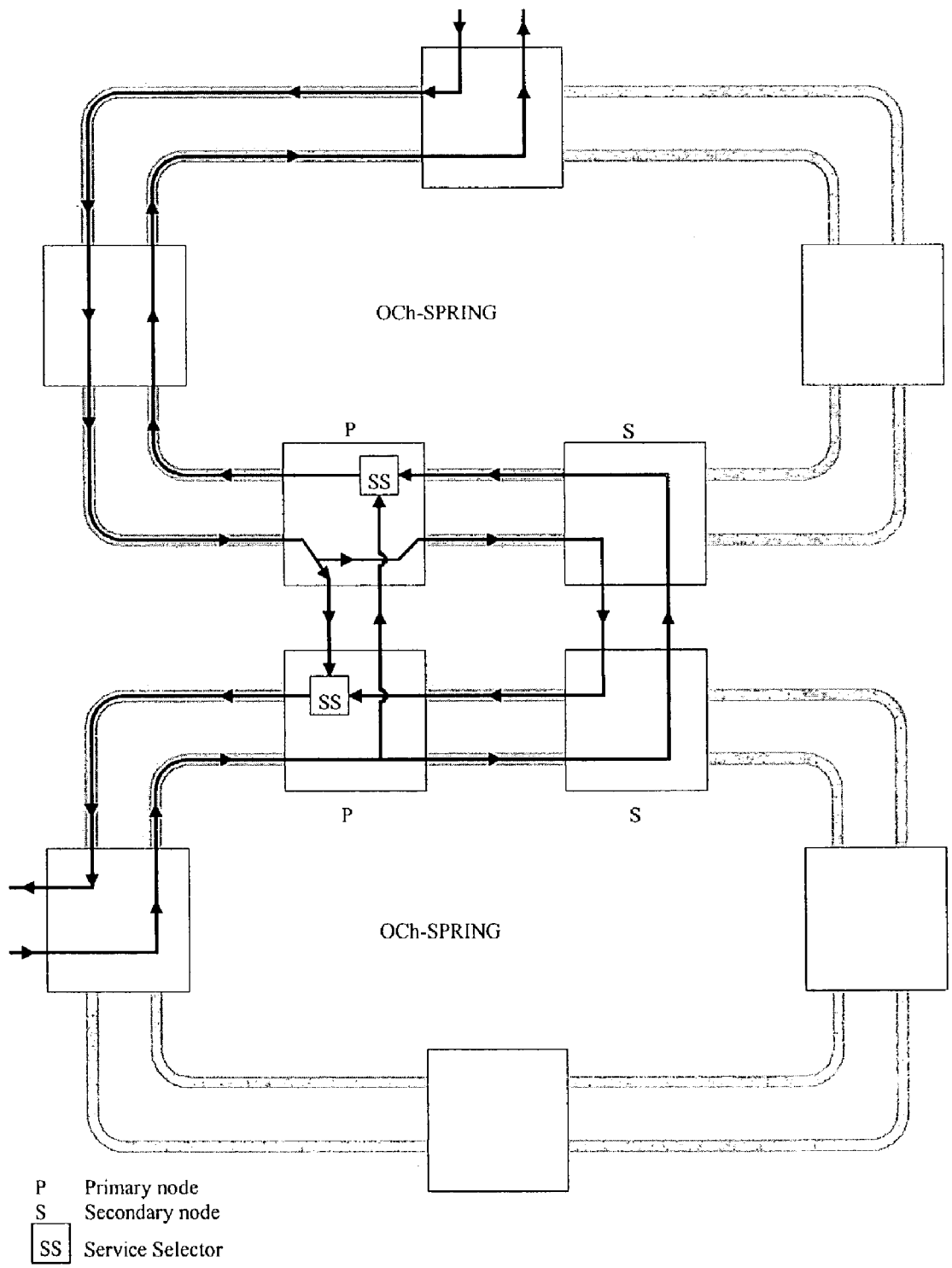
P   Primary node
S   Secondary node
SS  Service Selector
FIG 26: DRI between two OCh/SPRINGs (same side)

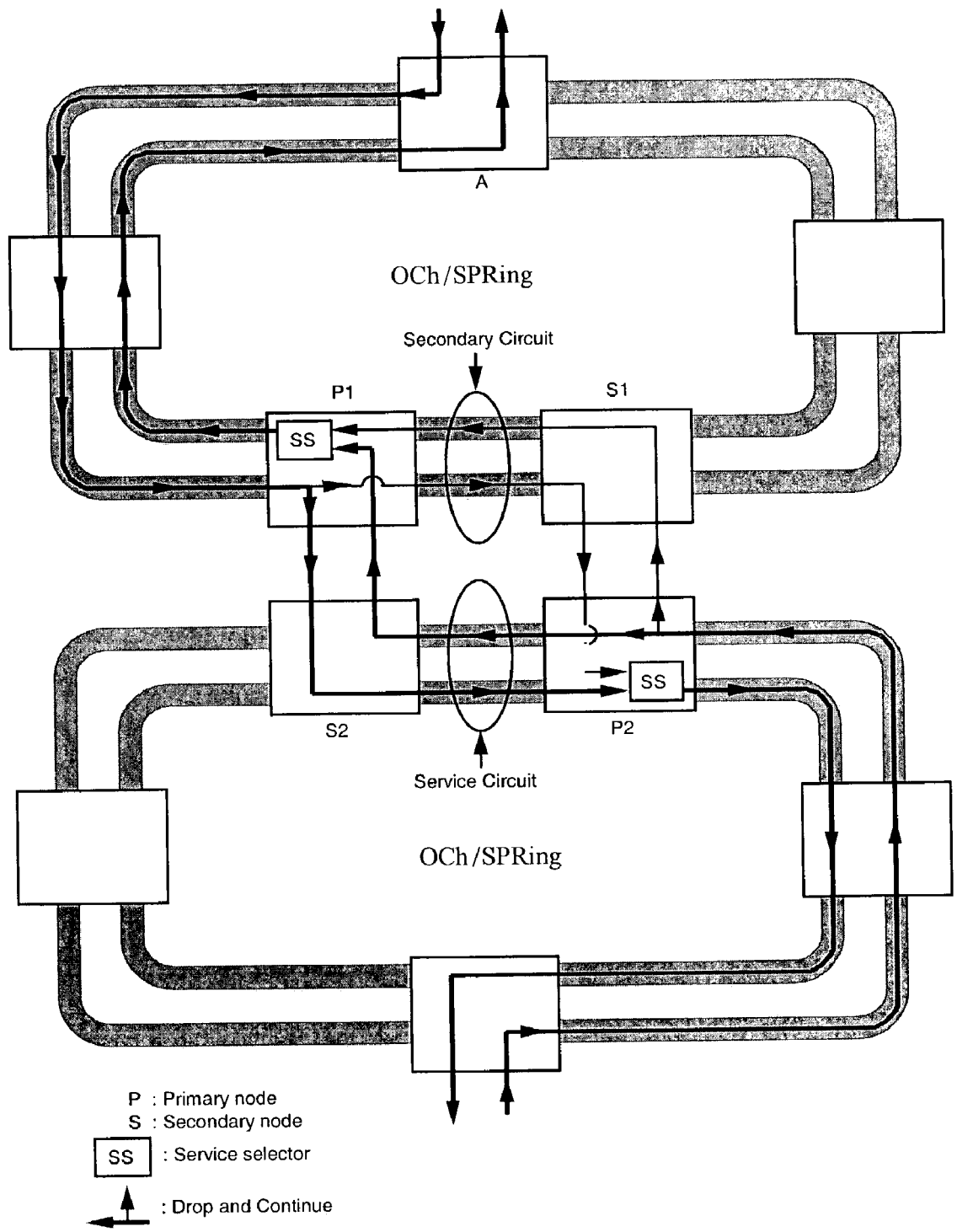
FIG 27: DRI between two OCh/SPRINGs (opposite side)

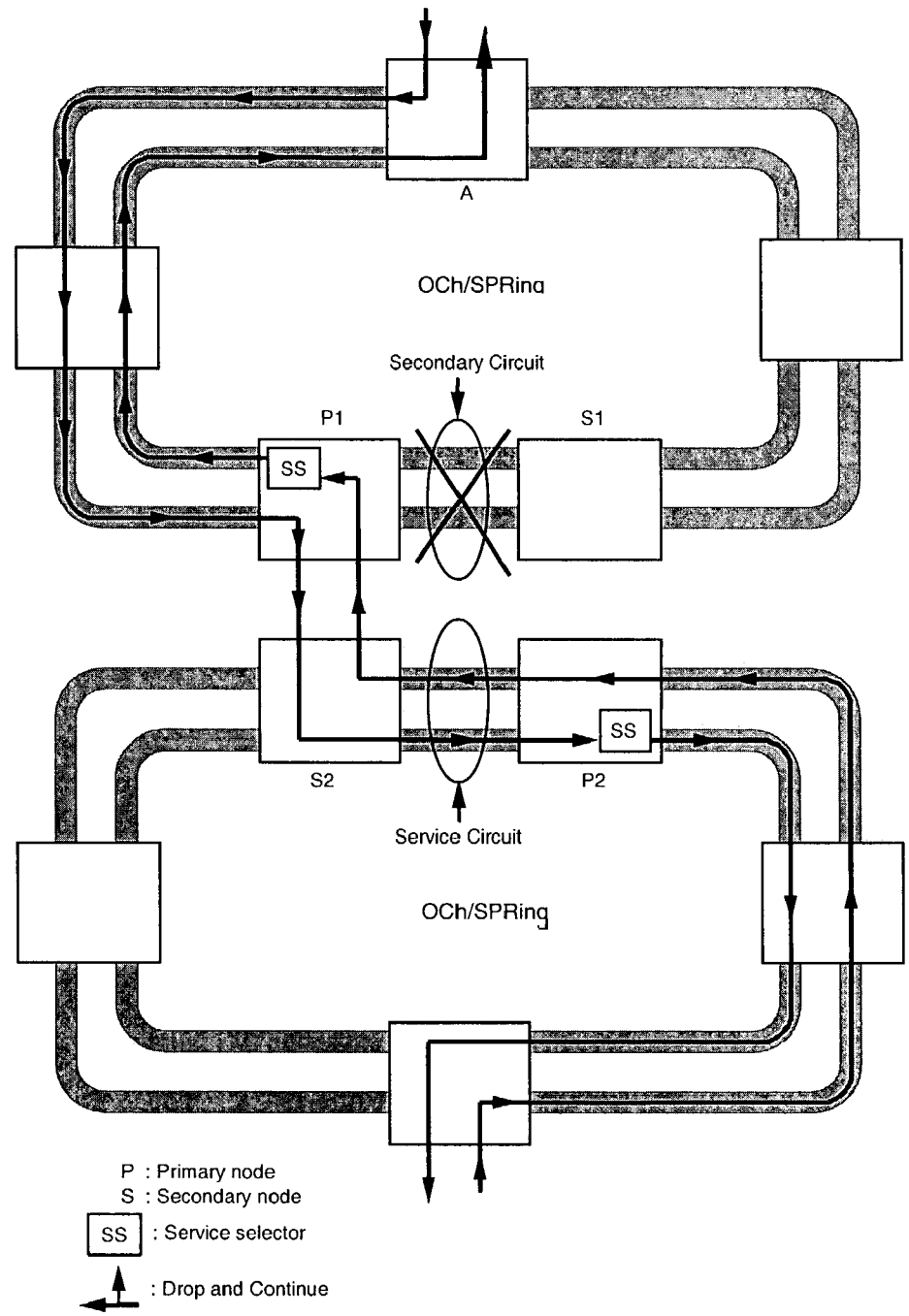
FIG 28: DRI between two OCh/SPRing: failure between the two interconnection nodes

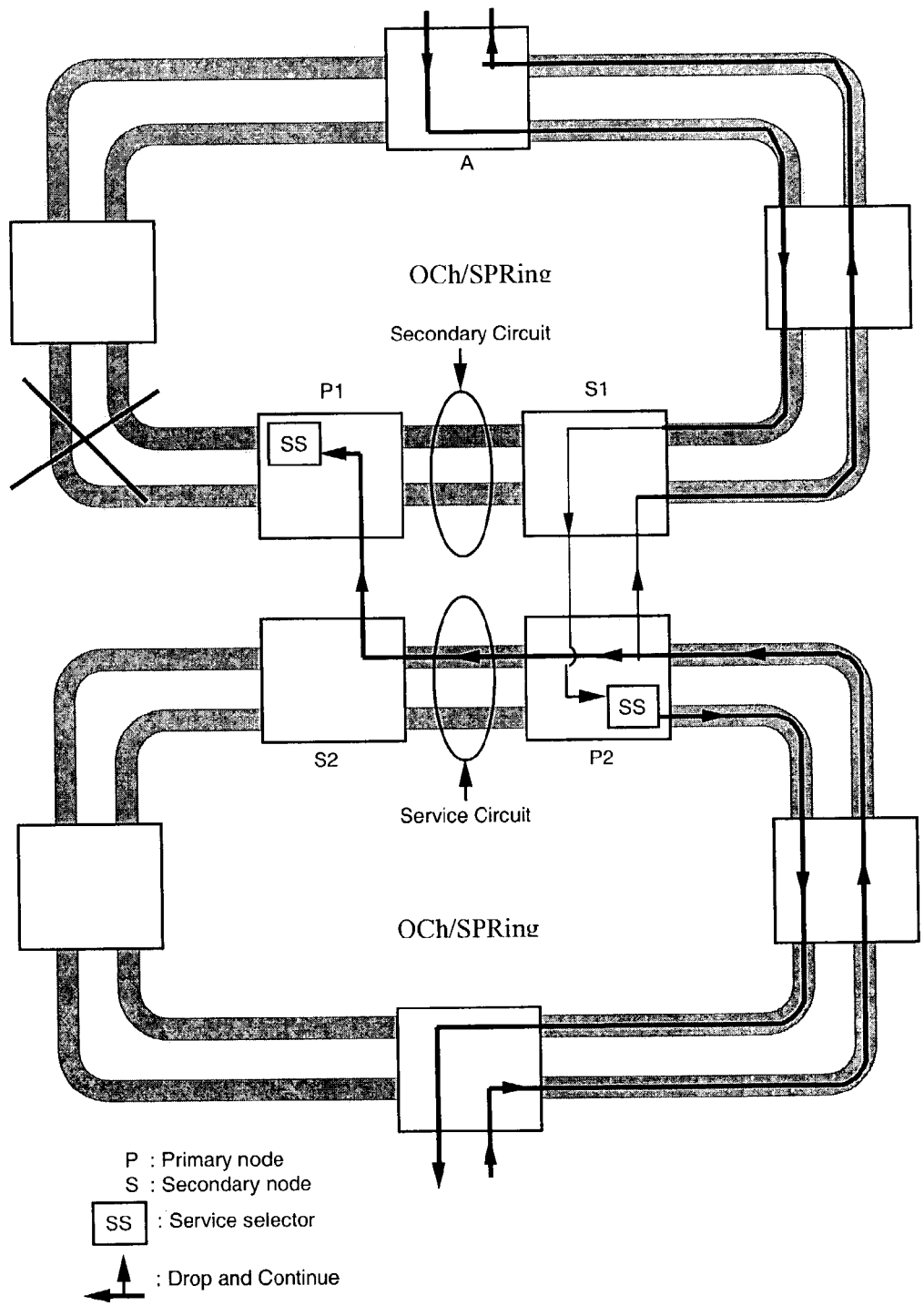
FIG 29: DRI between two OCh/SPRing: fiber cut in the top ring outside the interconnection nodes

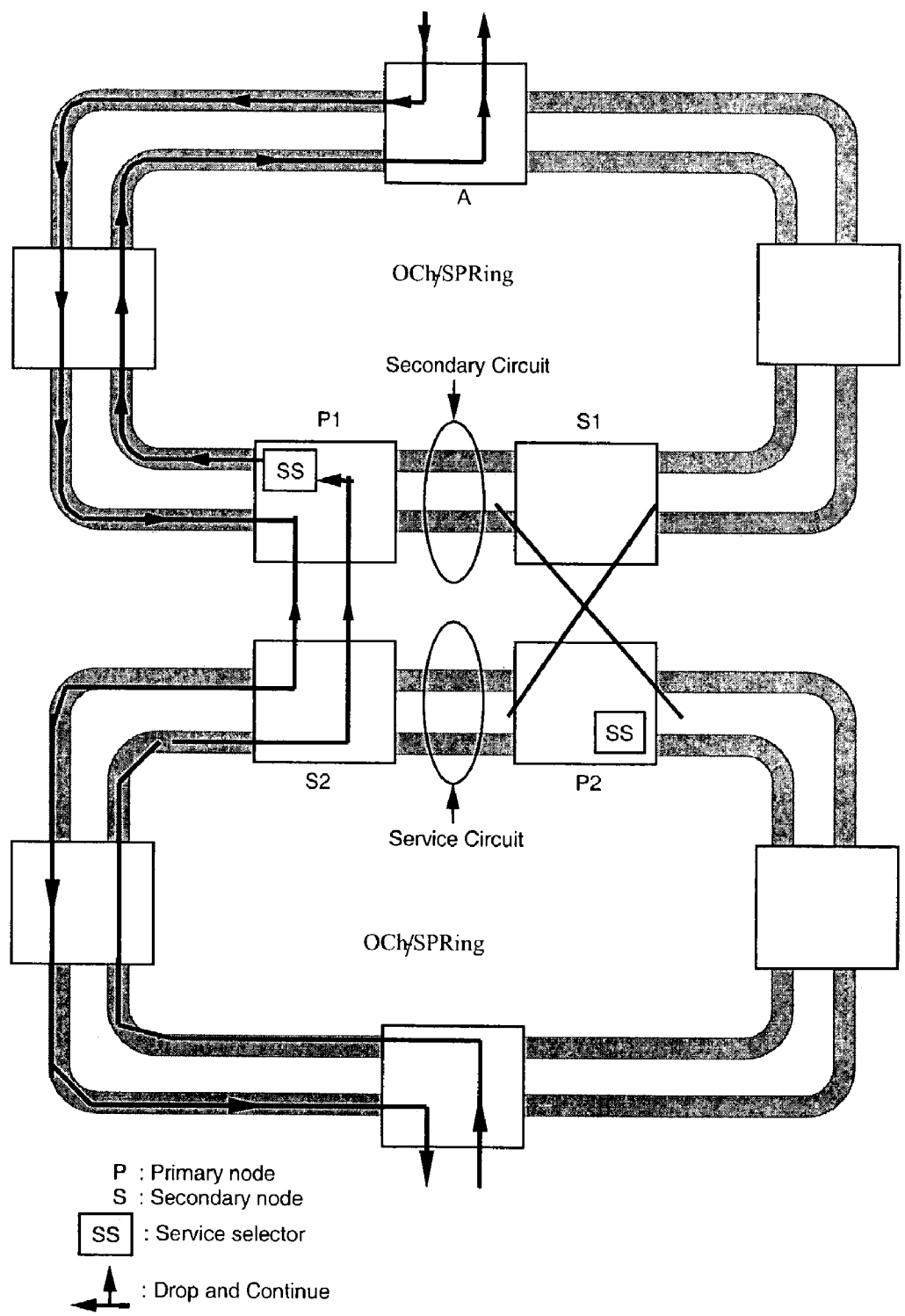
FIG 30: DRI between two OCh/SPRing: secondary node failure

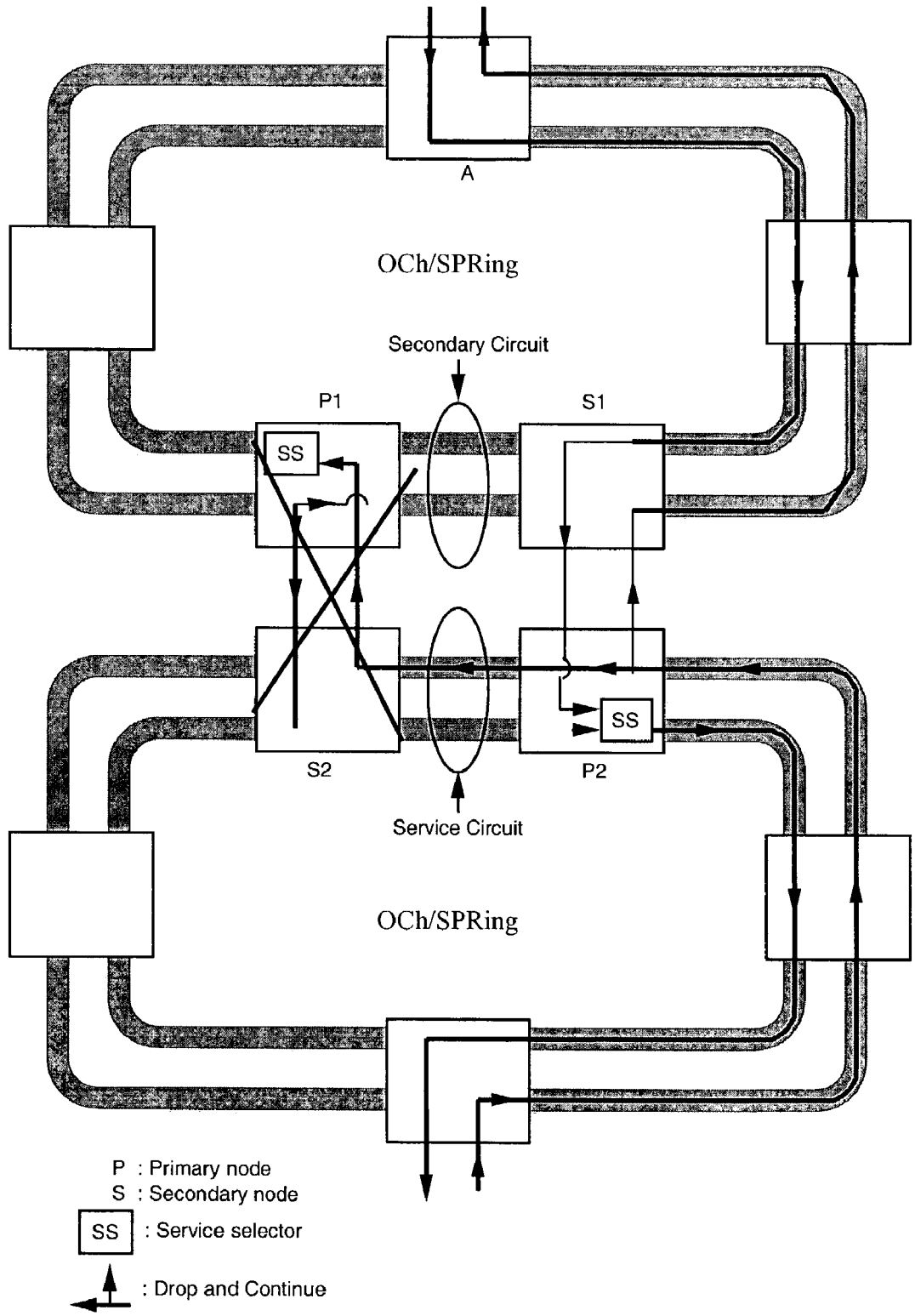
FIG 31: DRI between two OCh/SPRing: primary node failure

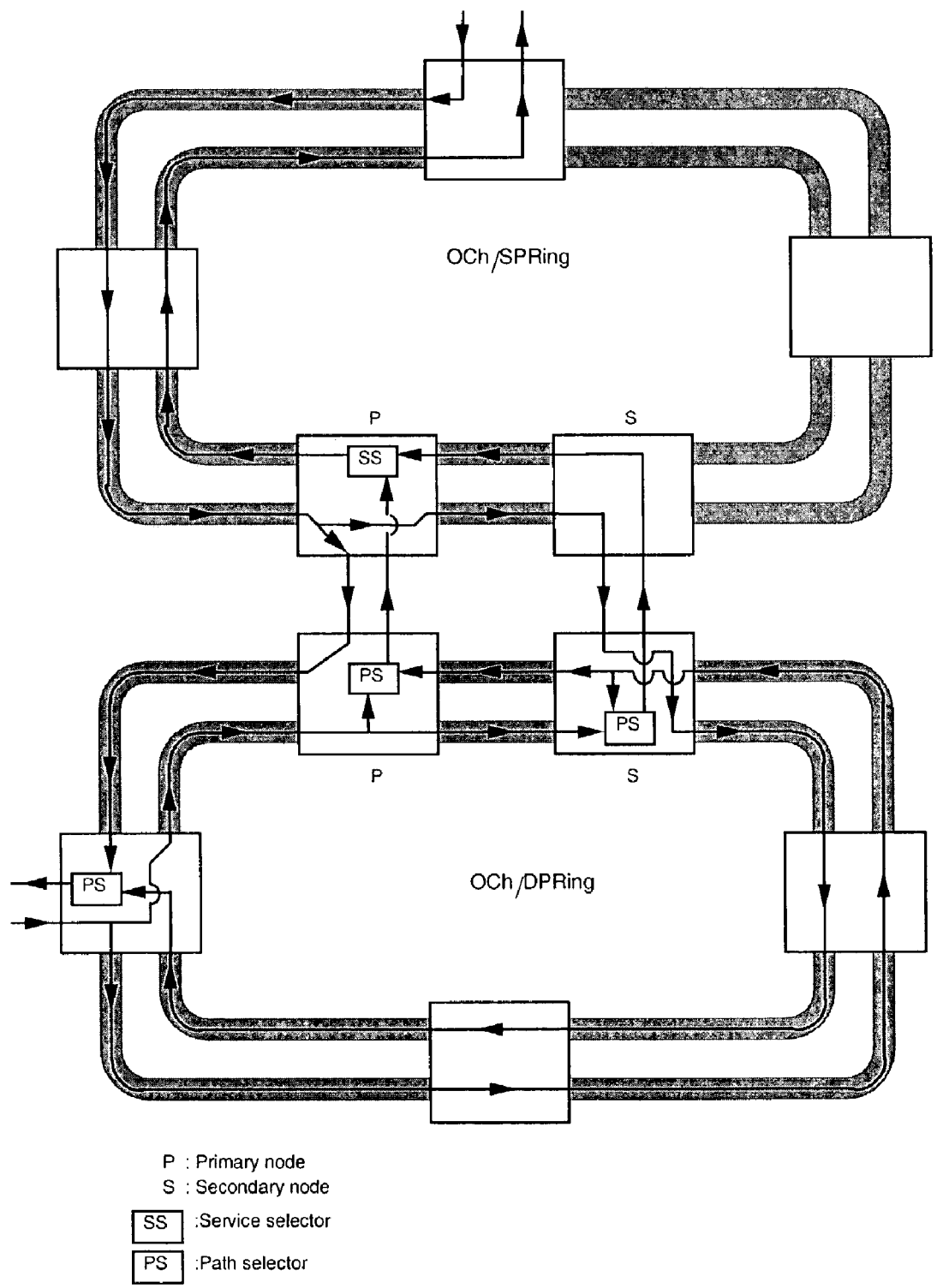
FIG 32: DRI between an OCh/SPRING and an OCh-DPRING

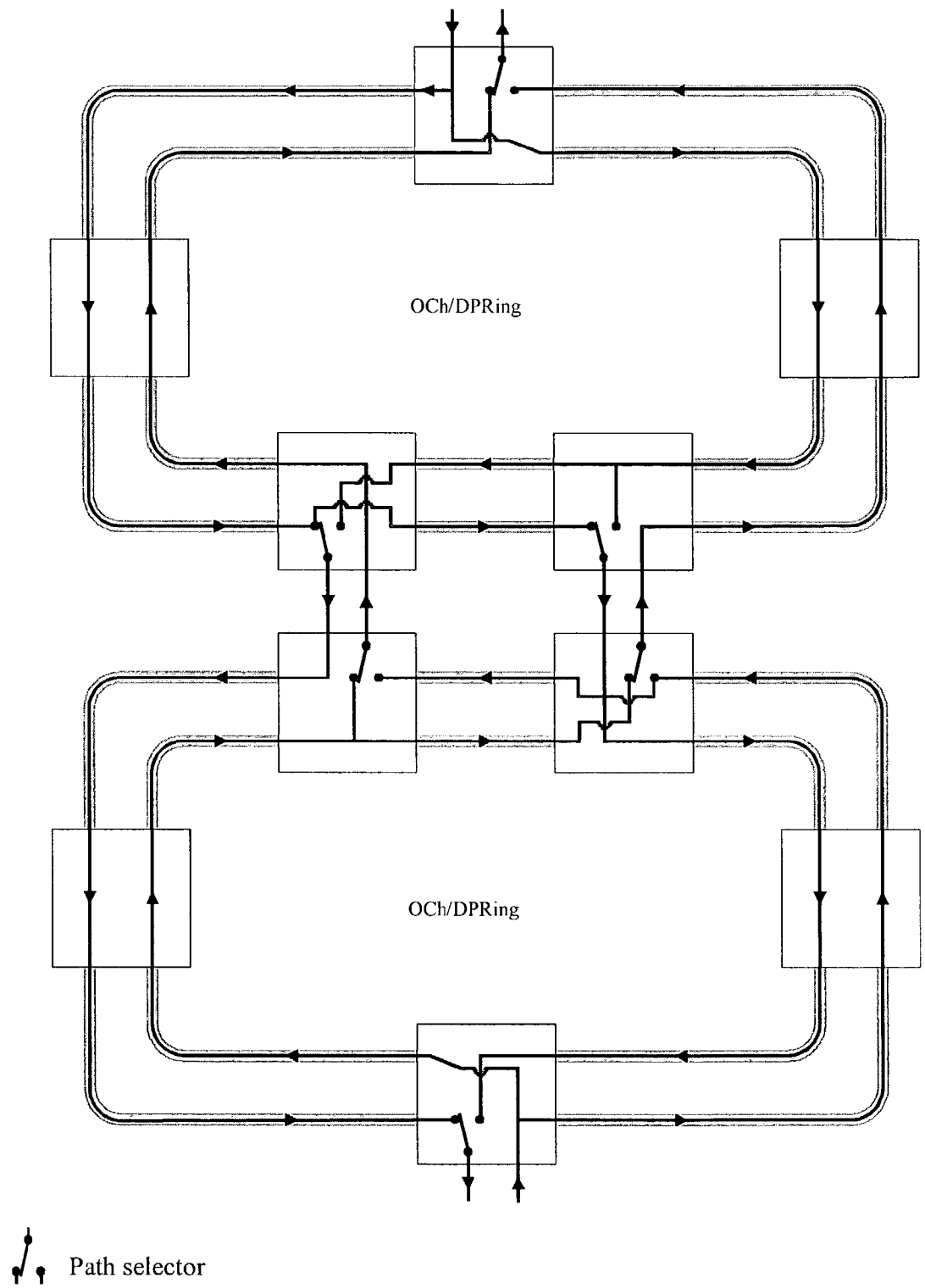
FIG 33: DRI between two OCh/DPRing

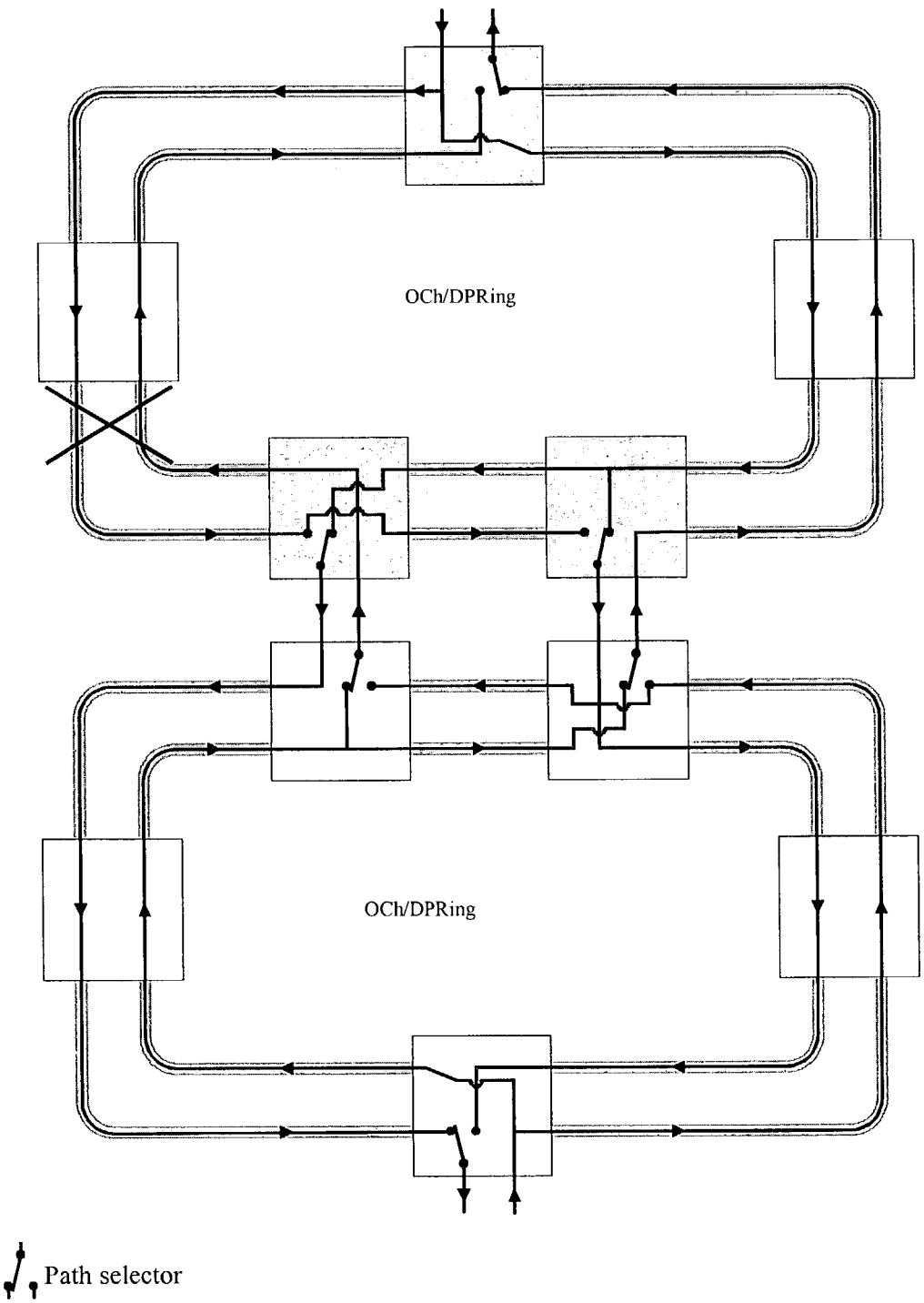
FIG 34: DRI between two OCh/DPRing: bi-directional failure in one ring

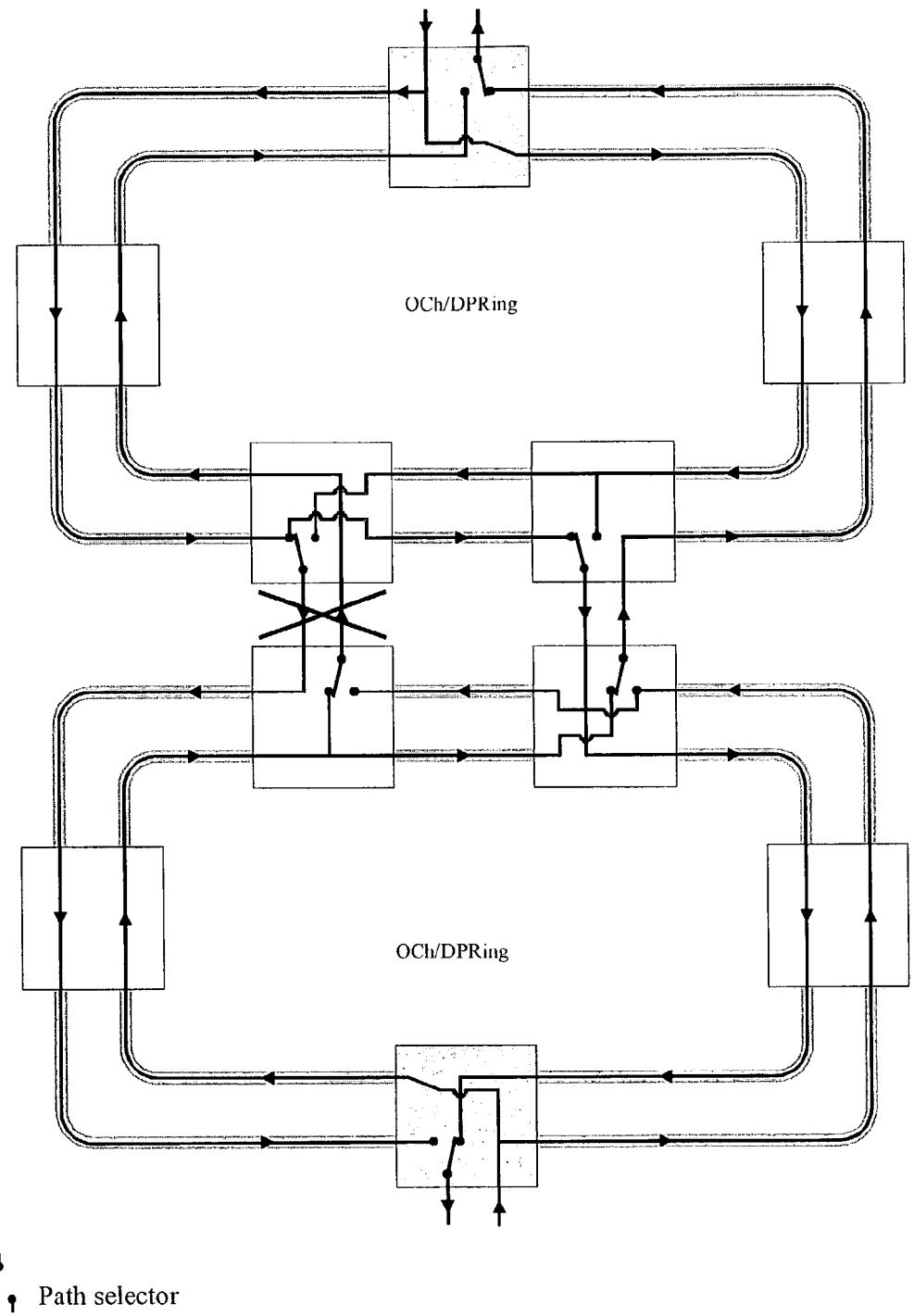
FIG 35: DRI between two OCh/DPR ing: bi-directional failure of one interconnection node

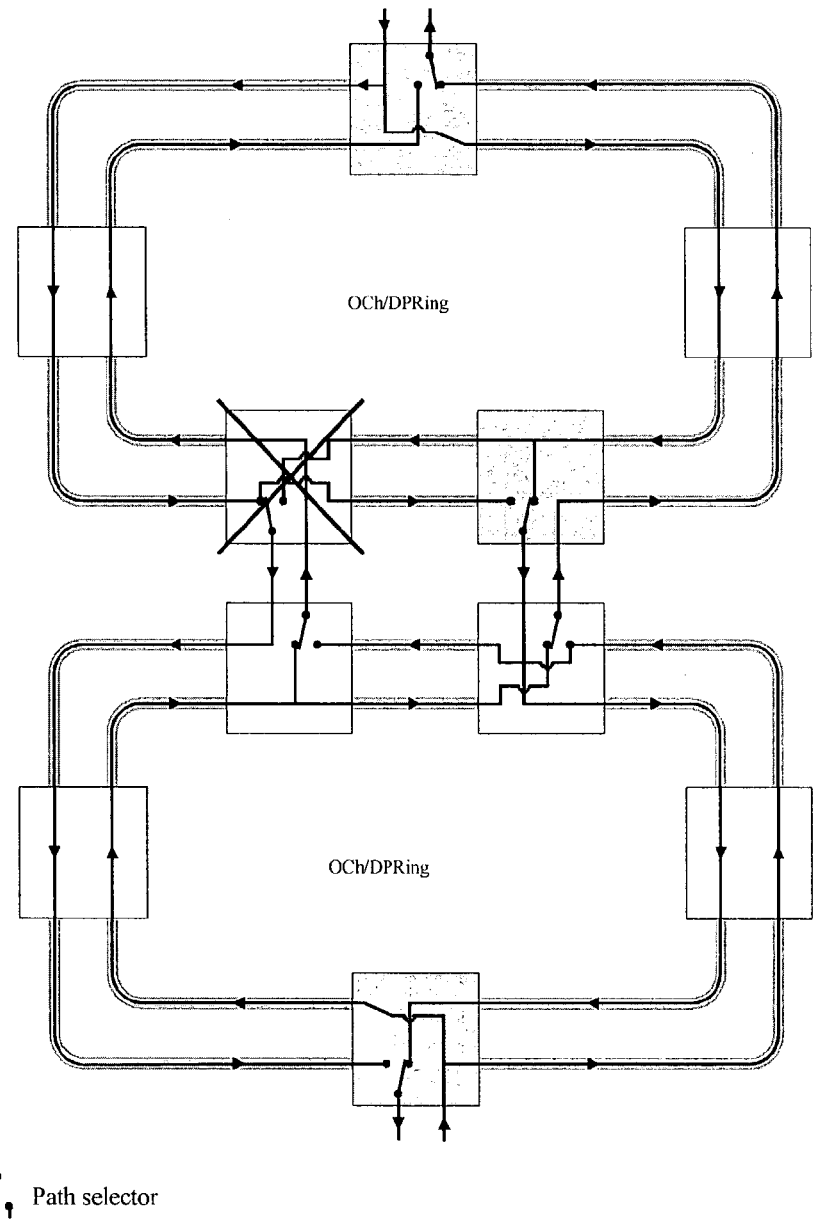
FIG 36: DRI between two OCh/DPRing: failure of one interconnection node

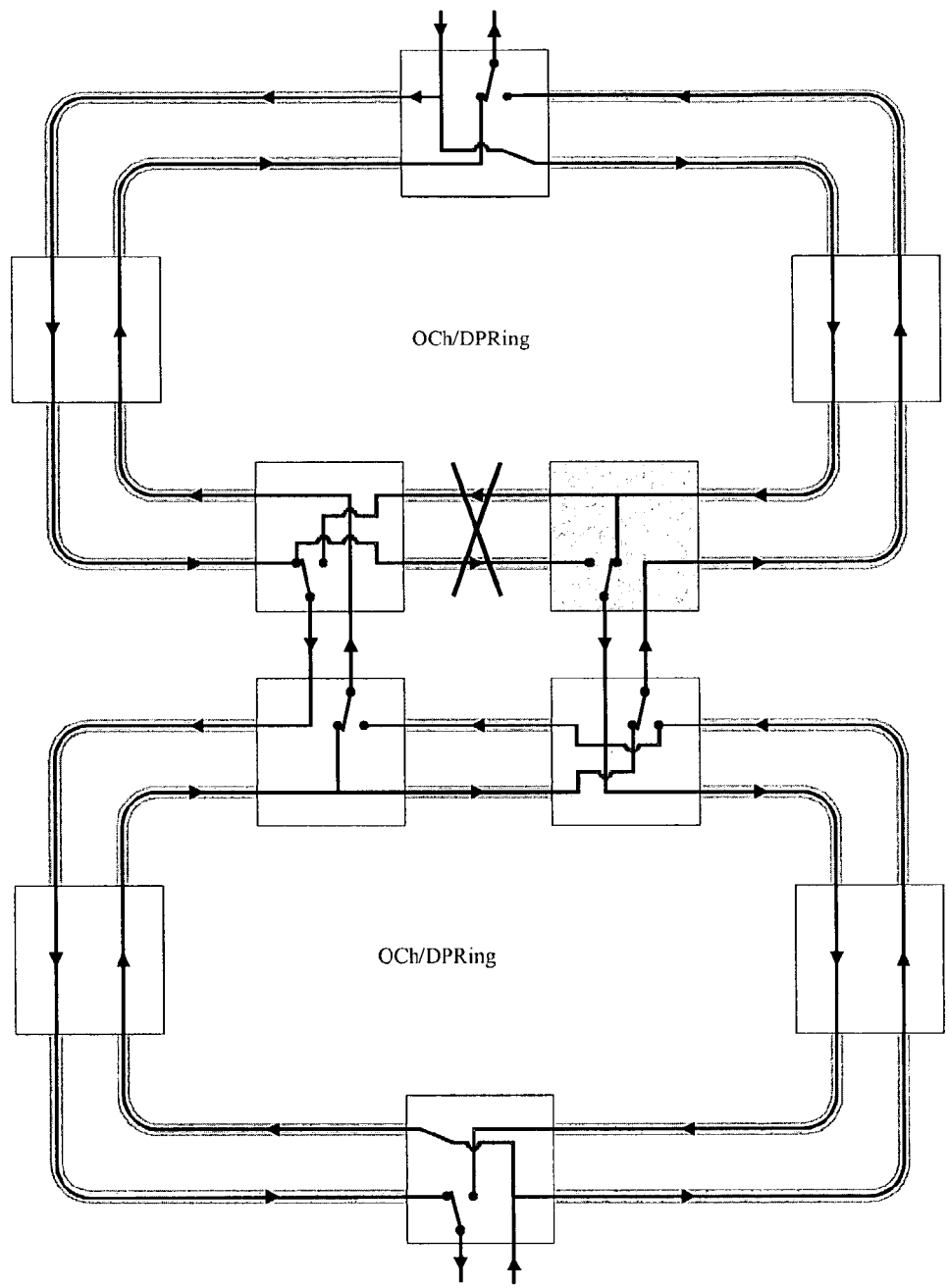
FIG 37: DRI between two OCh/DPRing: bi-directional failure between interconnecting nodes ion the same ring

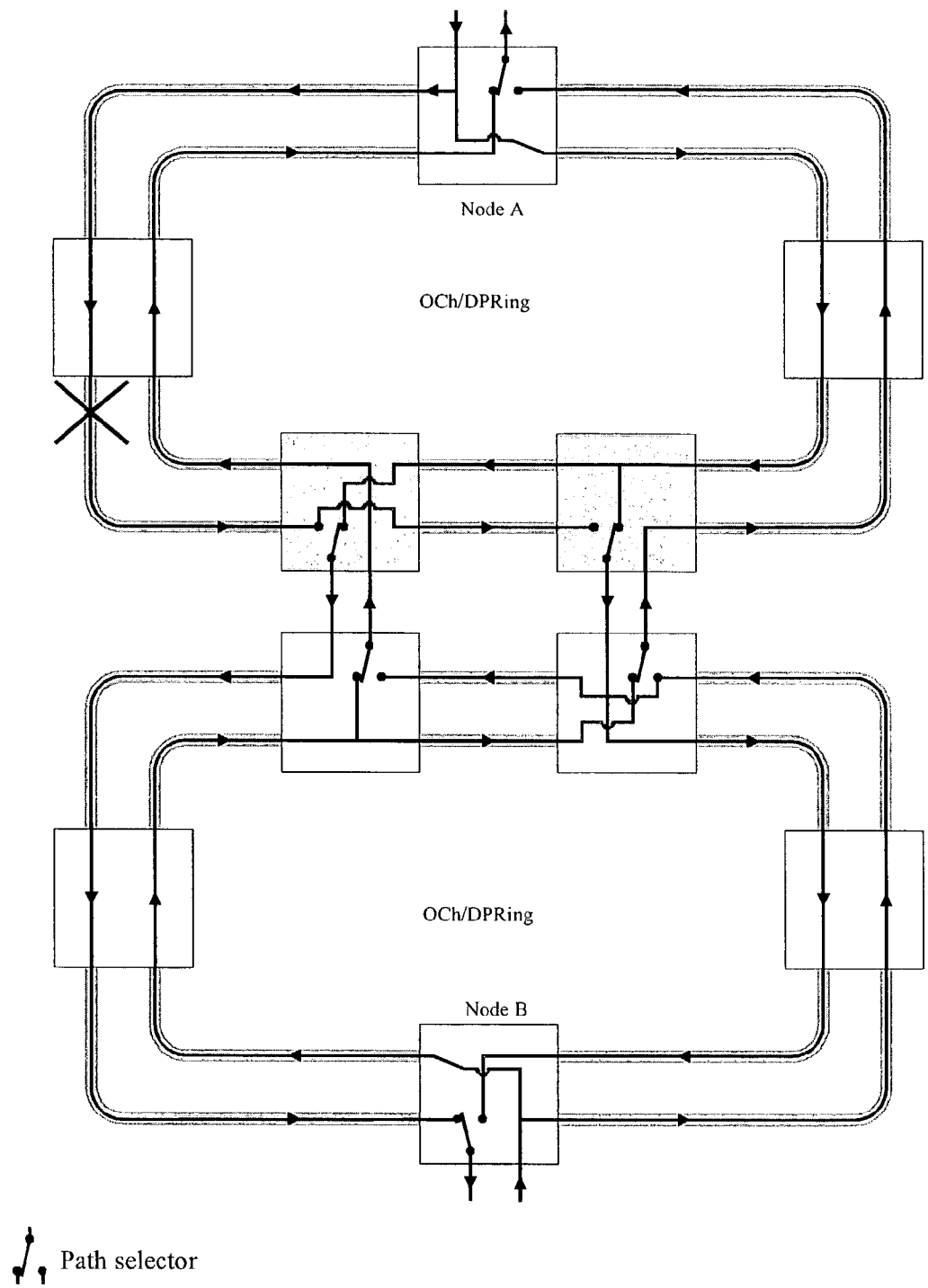
FIG 38: DRI between two OCh/DPRing: unidirectional failure from Node A to Node B

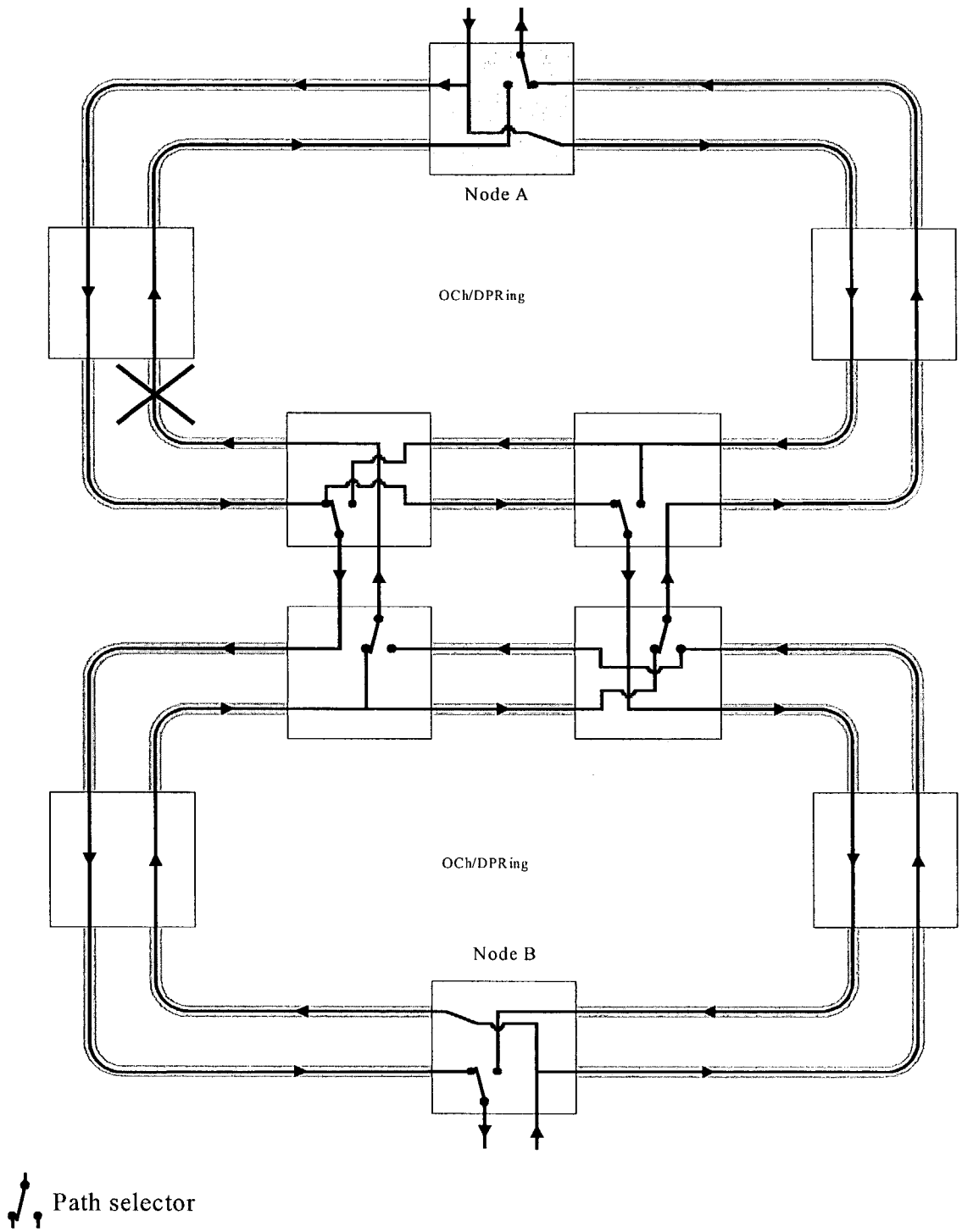
FIG 39: DRI between two OCh/DPRing: unidirectional failure from Node B to Node A

METHOD AND APPARATUS FOR PROVIDING MULTIPLE OPTICAL CHANNEL PROTECTION SWITCHING MECHANISMS IN OPTICAL RINGS

RELATED APPLICATIONS

This application is a continuation of U.S. patent application Ser. No. 10/262,572, filed on Sep. 30, 2002 now abandoned entitled "Method and Apparatus For Providing Multiple Optical Channel Protection Switching Mechanisms In Optical Rings."

FIELD OF THE INVENTION

The present invention relates generally to optical communications networks, and more particularly to an optical communication network including optical rings having protection switching service.

BACKGROUND

Current and next generation optical networks are capable of transporting multiple wavelengths on the same fiber by using Dense Wavelength Division Multiplexing (DWDM) technology. Typical systems are capable of transporting 32 or more wavelength channels, at 10 Gb/s rate each.

With capacities exceeding 320 Gb/s per fiber, it is becoming increasingly efficient and economical to perform protection and restoration of traffic in the optical layer. In fact, a major network failure, such a fiber cut or node failure, would impact an extremely large number of client layer devices (e.g., ATM switches or IP routers), making service layer protection intractable.

Many networks today are based upon fiber-ring architectures, as evidenced by the proliferation of SONET/SDH TDM rings all the way from the long-haul backbone to the metropolitan and regional areas. Most large backbone rings represent significant investments on the part of service providers, and expectedly will have longer lifetimes. As a result, ring architectures will clearly play a major role in the evolution of optical networks. Given this large, entrenched base of ring topologies, currently many operators are planning for a migration to equivalent dynamic optical ring architectures. Dynamic optical rings can be defined as fiber rings with dynamic light path provisioning capabilities (such as routing, add/drop, and protection). These optical wavelength routing rings, commonly also referred to as optical add-drop ring multiplexer (O-ADM) rings, will form the mainstay architecture for most metro/regional and even long-haul networks, helping operators ease their transition to future optical (mesh or hybrid ring-mesh) networks.

Since many operators have significant experience in deploying and maintaining SONET/SDH rings, future optical analogs of such time-division multiplexing (TDM) ring switching are of great transitional value. In optical rings, wavelength channels (as opposed to TDM circuits) undergo bypass, add, or drop operations at ring network elements.

Currently, there is a need for fast, scalable optical layer protection mechanisms. Individual channels (timeslots) in SONET/SDH rings (e.g., in Bi-directional Line Switching Ring or BLSR architectures) can be restored in 50 ms in the case of a "clean" ring that does not carry extra traffic, or in 100 ms if extra traffic is present in the ring.

Undoubtedly, optical ring solutions must provide equivalent, or improved, capabilities in order to replace SONET/SDH rings in a timely manner. It is now widely accepted that protection architectures in optical rings must provide restoration times similar to SONET/SDH ring protection architectures (i.e., 50 ms without Extra Traffic, and 100 ms when Extra Traffic is present in the ring).

So far, various optical layer protection mechanisms have been devised for optical rings. It is important to mention that each of these protection architectures is more suitable for specific traffic patterns, in the sense that they optimize the utilization of optical bandwidth for that specific traffic pattern. For example OCh/DPRing architectures work well with hubbed traffic patterns, where a single node in the ring (e.g., the hub) collects traffic from all the other nodes. On the other hand, OCh/SPRing architectures work better for distributed or mesh-like traffic patterns, where there is not a single node that collects all the traffic from the other nodes in the ring. In reality, the traffic pattern in ring networks is neither fully hubbed nor fully mesh-like. Optical rings deployed today by service providers and carriers in real networks provide a SINGLE optical layer ring protection mechanism for the whole ring. This results in under-utilization of the optical bandwidth in the ring—and consequently in a higher cost—because a single protection scheme cannot optimize the ring bandwidth utilization for real traffic patterns.

The present invention is therefore directed to the problem of providing multiple optical ring protection schemes in the same physical ring, in order to better adapt the protection architecture to the traffic pattern in the ring.

SUMMARY OF THE INVENTION

The present invention solves these and other problems by providing, inter alia, a technique for allocating protection-switching mechanisms on a per wavelength basis. This allows a designer of an optical network to select a particular protection switching mechanism for a given traffic type, which is usually specific to a particular wavelength in an optical network. For another traffic type, the designer can allocate a different protection switching mechanism, thereby providing optimal protection switching for each traffic type.

BRIEF DESCRIPTION OF THE DRAWINGS

FIG. 1A shows a physical view of an example of a conventional optical ring.

FIG. 1B shows a logical view of the optical ring of FIG. 1a.

FIG. 1C shows the various optical layers used in optical network communication in a hierarchical view.

FIGS. 2A-C show various idealized traffic patterns for a ring with eight nodes: (a) a full-mesh traffic pattern; (b) a hubbed traffic pattern; and (c) a hybrid traffic pattern, where node one (1) acts like a hub, but still the other nodes exchange traffic among them.

FIG. 3A shows the failure-free state for a 1+1 Optical Channel Dedicated Protection Ring.

FIG. 3B shows a failure state for the 1+1 Optical Channel Dedicated Protection Ring of FIG. 3a.

FIG. 4A shows a 2-fiber ring under normal conditions for an Optical Channel Shared Protection Ring.

FIG. 4B shows a 4-fiber Shared Protection Ring under normal conditions.

FIG. 5A shows the same 2-fiber Optical Channel Shared Protection Ring under a failure condition.

FIG. 5B shows a span switch event in the same 4-fiber Shared Protection Ring.

FIG. 6A shows the way an Optical Channel Shared Protection Ring shares protection resources according to one aspect of the present invention.

FIG. 6B shows a ring switch event in the same 4-fiber Shared Protection Ring.

FIG. 7 shows the way an Optical Channel Shared Protection Ring shares protection resources according to one aspect of the present invention.

FIG. 8 illustrates how Extra Traffic can be provided in OCh/SPRing architectures according to another aspect of the present invention.

FIG. 9 illustrates how Extra Traffic is preempted during the OCh/SPRing signaling process to make room for the working traffic to be switched from the working channel to the protection channel if a failure occurs in the network according to yet another aspect of the present invention.

FIG. 10 illustrates the concept of the unprotected/link-and-node disjoint paths according to still another aspect of the present invention.

FIG. 11 shows an exemplary embodiment of a nodal architecture of a flexible Optical Add-Drop Multiplexer according to a further aspect of the present invention.

FIG. 12A shows the transponder (TRP) cards configurations—with electrical switching—for two Optical Channel Dedicated Protection Ring services—one service configured using λ1 for both working and protection services, the other using λ3 according to still another aspect of the present invention.

FIG. 12B shows the transponder (TRP) cards configuration—with optical switching—for two Optical Channel Dedicated Protection Ring services according to still another aspect of the present invention.

FIG. 13 illustrates the wavelength configuration of a node, specifically for an Optical Channel Shared Protection Ring according to another aspect of the present invention.

FIG. 14A shows the TRP cards configurations—with electrical switching—for two Optical Channel Shared Protection Ring protected services—both services configured using λ1 for working channels and L3 for protection channels according to yet another aspect of the present invention.

FIG. 14B shows the TRP configuration with optical switching for two Optical Channel Shared Protection Ring protected services.

FIG. 15 illustrates the TRP card configuration—with electrical switching—for four unprotected services, using wavelength λ1, λ2, λ3 and λ4 according to still another aspect of the present invention.

FIG. 16 shows TRP card configuration—with electrical switching—for the Optical Channel Shared Protection Ring and extra traffic according to yet another aspect of the present invention.

FIG. 17 depicts how an exemplary embodiment of mix and match protection on a per-channel basis according to another aspect of the present invention allows diverse services.

FIG. 18 illustrates a hub traffic pattern where the hub node is node one (1).

FIG. 19 shows an example of two crossing demands, in which demand 1 is between node one (1) and node five (5), and demand 2 is between node four (4) and node eight (8).

FIG. 20 shows one extreme example to show Optical Channel Shared Protection Ring advantage over Optical Channel Dedicated Protection Ring is in the case of adjacent traffic demands.

FIG. 21 shows an eight-node ring with completely fully meshed traffic demands.

FIGS. 22-25 depict various embodiments of protection groups according to other aspects of the present invention.

FIG. 26 depicts Dual Ring Inter-working (DRI) between two OCh/SPRINGs (same side).

FIG. 27 depicts DRI between two OCh/SPRINGs (opposite side).

FIG. 28 depicts DRI between two OCh/SPRing, in which there is a failure between the two interconnection nodes.

FIG. 29 depicts DRI between two OCh/SPRing, in which there is a fiber cut in the top ring outside the interconnection nodes.

FIG. 30 depicts DRI between two OCh/SPRing, in which there is a secondary node failure.

FIG. 31 depicts DRI between two OCh/SPRing, in which there is a primary node failure.

FIG. 32 depicts DRI between an OCh/SPRING and an OCh-DPRING.

FIG. 33 depicts DRI between two OCh/DPRing.

FIG. 34 depicts DRI between two OCh/DPRing, in which there is a bi-directional failure in one ring.

FIG. 35 depicts DRI between two OCh/DPRing, in which there is a bi-directional failure of one interconnection node.

FIG. 36 depicts DRI between two OCh/DPRing, in which there is a failure of one interconnection node.

FIG. 37 depicts DRI between two OCh/DPRing, in which there is a bi-directional failure between interconnecting nodes ion the same ring.

FIG. 38 depicts DRI between two OCh/DPRing, in which there is a unidirectional failure from Node A to Node B.

FIG. 39 depicts DRI between two OCh/DPRing, in which there is a unidirectional failure from Node B to Node A.

DETAILED DESCRIPTION

U.S. patent application Ser. Nos. 10/200,066 and 10/199,999, both filed on Jul. 19, 2002 disclose a technique for performing automatic protection switching in an optical channel shared protection ring, and are hereby incorporated by reference herein as if repeated herein in their entirety, including the drawings.

It is worthy to note that any reference herein to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Multiple Service Levels

Carriers and service providers deploying high bit rate services and wavelength services require the capability of providing different levels of services to their customers. An optimal technique for satisfying this requirement employs optical ring network architectures that are capable of providing protection options on a per-wavelength basis.

In general, there are four levels of service are employed in a network, including an optical network. First, there is so-called Unprotected Service, which uses any available wavelength. This service is not protected when a network failure occurs, and is not preempted to protect an Optical Channel Shared Protection Ring (OCh/SPRing) service. This option is useful for many data applications that do not require optical layer protection.

Second, there is service that employs Link-and-Node Disjoint Paths. Link-and-node Disjoint Paths refer to two lightpaths on a ring, with the same source and destination nodes but not sharing any other nodes or links. This option supports path diversity, which is useful for data applications or to run subtending SONET/SDH rings with protection switching over an optical ring. The data applications that do not require optical layer protection and restoration, but only the assurance that traffic is flowing between source and destination nodes, require disjoint circuits. In the case of one circuit failure, traffic can survive by over-flowing from the first to the second disjoint path.

Third, there is Pre-emptable extra traffic. This is traffic that is transported over shared or common protection wavelengths, which will be preempted and discarded when the protection wavelength is taken over by "working" traffic as a result of a protection-switching event.

Fourth, there is protected traffic, which is protected either through dedicated or shared protection schemes.

Protection Architectures and Traffic Patterns

Different optical layer protection mechanisms have been devised for optical rings. A first architectural distinction concerns whether the protection mechanism provides dedicated protection or shared protection. In dedicated protection architectures (e.g., OCh/DPRing) each protection resource in the ring (e.g., individual wavelengths) is always reserved for protection (i.e., it cannot be used for transporting other protected traffic) and is dedicated to one "working" resource. In shared protection architectures, on the other hand, a single protection resource can be shared among multiple "working" resources.

A second architectural distinction concerns whether the protection mechanism performs Optical Channel-level switching, based on Optical Channel-level indications, independently for each optical channel on the ring. Optical Multiplex Section Shared Protection Ring (OMS/SPRing) architectures switch optical channels as a group within the ring, and therefore are not capable of protecting optical channels independently of one another based on optical-channel-level failure indications.

On the other hand Optical Channel Shared Protection Ring Architectures (OCh/SPRing) are capable of performing Optical-channel-level protection switching, based on optical-channel-level indications, independently for each optical channel on the ring.

It is important to mention that each of these protection architectures is more suitable for specific traffic patterns, in the sense that they optimize the utilization of optical bandwidth for that specific traffic pattern. For example OCh/DPRing architectures work well with hubbed traffic patterns, where a single node in the ring (e.g., the hub) collects traffic from all the other nodes. On the other hand, OCh/SPRing architectures work better for distributed or mesh-like traffic patterns, where there is not a single node that collects all the traffic from the other nodes in the ring.

Realistic Traffic Patterns

In reality, the traffic pattern in ring networks is neither fully hubbed nor fully mesh-like. Hybrid traffic patterns abound in real networks. For example, FIGS. 2a-c show, for a ring with eight nodes: (a) a full-mesh traffic pattern; (b) a hubbed traffic pattern; and (c) a hybrid traffic pattern, where node one (1) acts like a hub, but the other nodes still exchange traffic among themselves.

Optical rings deployed today by service providers and carriers in real networks provide a SINGLE optical layer ring protection mechanism for the whole ring. This results in under-utilization of the optical bandwidth in the ring—and consequently in a higher cost—because a single protection scheme cannot optimize the ring bandwidth utilization for real traffic patterns.

Optical Channel Ring Protection Architectures

1+1 or 1:1 Optical Channel Dedicated Protection Ring (1+1/1:1-OCh/DPRing)

The term Dedicated Path Protection Ring (DPRing) is usually associated with two-fiber unidirectional path switched OADM rings. These rings implement "end-to-end" wavelength channel protection, and therefore are more commonly termed as optical channel DPRing (OCh/DPRing). OCh/DPRing rings dedicate one fiber for working wavelength channels and the other fiber for corresponding protection wavelength channels in the counter-propagating directions. Traffic is either permanently bridged at the head-end and sent along both fibers, hence the term "1+1 protection," or bridged (or switched) at both the head and tail end only in the event of a protection switch, hence the term "1:1 protection."

To support an OCh/DPRing service, two lightpaths are provisioned between the source and destination: one lightpath is designated as a working path and the other lightpath as a protection path. In 1+1-OCh/DPRing, the signal is bridged to both lightpaths at the source, and is selected by a selector switch at the destination, whereas in 1:1-OCh/DPRing, traffic is either bridged or switched to protection only in the event of a protection switch. In DPRing, protection lightpaths are dedicated to individual demands, and are not shared among multiple demands. Moreover, as receiver-node based switchovers can be done, no signaling protocol is required for the 1+1-OCh/DPRing. In 1:1-OCh/DPRING, the signal is not permanently bridged to both lightpaths at the source/head end. Hence, in the event of a protection switch, coordination is required between the head end and tail end nodes to bridge or switch the signal onto the protection lightpath. This coordination can be achieved using the optical supervisory channel (OSC), a wavelength signal dedicated to inter-nodal communication, as described in U.S. patent application Ser. No. 10/099,890, filed Mar. 15, 2002 by the same assignee and entitled "Method And Apparatus For Interconnecting a Plurality Of Optical Transducers With a Wavelength Division Multiplexed Optical Switch," which is hereby incorporated by reference as if repeated herein in its entirety, including the drawings.

The way 1+1-OCh/DPRing works is illustrated in FIGS. 3a-b. FIG. 3a shows the failure-free state. For unidirectional lightpath from A to B, the working path is A-B on fiber 1 while the protection path is A-D-C-B on fiber 2. At the source node A, traffic is bridged into the working channel from A to B, and also to the protection channel from A to D to C to B. At the destination node B, under a failure free condition a wavelength selector selects traffic from the working channel. Similarly, the unidirectional lightpath from B to A, the working path is B-A on fiber 2 and protection path B-C-D-A on fiber 1. FIG. 3b shows a failure state. If the link between A and B is cut, both lightpaths from A to B and from B to A are affected. Since the traffic is bridged into both the working channel and protection channel, the only thing that needs to be done upon the detection of failure is to perform a switching at destination node that is to select traffic from protection channel rather than from the working channel.

Optical Channel Shared Protection Ring (OCh/SPRing)

The optical channel-shared protection ring (OCh/SPRing) architectures are designed to improve upon the spatial resource utilization over the DPRing designs. The OCh/SPRing scheme provides a protection architecture that can protect each optical channel individually based on optical channel level failure indications.

For an OCh/SPRing case, FIG. 4A shows a 2-fiber ring under normal conditions. To achieve resource sharing and intra-fiber coordination between working/protection channels, these 2-fiber rings require a wavelength numbering and assignment scheme to effect a grouping between working and protection channels. In the 2-fiber OCh/SPRing, this is equivalent to making "two fibers" out of a single physical fiber, with each having only half number of the wavelengths.

Each fiber has an equal number of working and protection wavelengths, and the working wavelengths group in a given fiber corresponds to the protection wavelengths group in the other fiber. The client signal origination and destination points are node A and C, and the working path on the ring for the client signal is through Node A-B-C. A 2-fiber OCh/SPRing services generally use wavelength pairs (e.g., pair 1,3; pair 5,7; pair 9,11; etc) where the first wavelength is for service channels and the second wavelength is for protection channels. Each wavelength pair can be used as many times around the ring as there are disjoint paths. This sharing of wavelengths enables efficient utilization of bandwidth compared to protection features that require dedicated protection paths. This protection scheme also allows for optional use of the protection wavelength pair to support pre-emptable "extra traffic."

FIG. 5A shows the same 2-fiber OCh/SPRing under a failure condition. Upon detection of channel failure from A-C, and from C-A as well, the source node A and destination node C will coordinate the ring switch to switch the working channel A-B-C (C-B-A) to the protection channel A-D-C (C-D-A).

Additionally, in OCh/SPRing schemes, differing levels of protection resource sharing can be allowed. For example, idle protection wavelengths can be used to carry low-priority pre-emptable traffic, i.e., extra traffic. When the OCh/SPRing service fails, extra traffic is preempted and the OCh/SPRing service is routed along its protected path.

Furthermore, protection wavelengths themselves can be shared among multiple working channels. OCh/SPRing offers an attractive protection option especially for "non-hubbed", i.e., mesh-like traffic demands.

The way 2-fiber OCh/SPRing shares protection resources is illustrated in FIGS. 6A and 7. FIG. 6A shows the normal fault-free state. In FIG. 6A, three lightpaths (i.e., lightpath one (1), lightpath two (2) and lightpath three (3)) share the same working/protection wavelength pair ($\lambda_1, \lambda_3$). Lightpath one (1) consists of A-B-C-D (D-C-B-A) (bi-directional). Lightpath Two (2) consists of F-E-D (D-E-F). Lightpath three (3) consists of A-F (F-A). The three lightpaths can be provisioned using the same working wavelength ($\lambda_1$), because they are completely disjoint. FIG. 7 shows a failure state where there is a fiber cut between node B and node C. The fiber cut affects the light path one (1). As a result, OCh/SPRing protection switching will be initiated for the lightpath one (1). After the protection switching, lightpath one (1) will now use the protection wavelength. That is, lightpath one (1) A-D (D-A) is rerouted from A-B-C-D (D-C-B-A) to A-F-E-D (D-E-F-A).

The 4-fiber OCh/SPRing is conceptually analogous to the 2-fiber OCh/SPRing, where the two working fibers would be carrying the working lightpaths, and the two protection fibers would be carrying the protection lightpaths. The 4-fiber variant of the OCh/SPRing can support two types of protection switching: (1) span switching, in the event that only the working channels or fibers are affected on a particular span, or (2) ring switching, in the event that both the working and protection channels or fibers are affected.

FIG. 4B shows a 4-fiber Shared Protection Ring under normal conditions. The client signal origination and destination points are node A and C, and the working path on the ring for the client signal is through Node A-B-C. As the figure illustrates, each direction of the client signal is carried in a separate working fiber.

FIG. 5B shows a span switch event in the same 4-fiber Shared Protection Ring. Upon detection of failure in the A-B span, nodes A and B at both ends of the span switch the failed resources on the working fibers to the protection fibers.

FIG. 6B shows a ring switch event in the same 4-fiber Shared Protection Ring. In this case both the working and protection channels or fibers are affected in the path A-B-C (e.g. because a node failure at node B). Upon detection of failure, nodes A and C at both ends of the path switch the failed resources on the working fibers to the protection fibers.

Extra Traffic in OCh/SPRing

FIG. 8 illustrates how Extra Traffic (ET) can be provided in OCh/SPRing architectures. In the figure, three OCh/SPRing protected services are provisioned using the same working wavelength ($\lambda_1$), and protection wavelength ($\lambda_3$). Three Extra Traffic signals are provisioned after the working traffic. The Extra Traffic runs parallel to the OCh/SPRing working traffic.

If a failure occurs in the network, Extra Traffic will be preempted during the OCh/SPRing signaling process to make room for the working traffic to be switched from the working channel to the protection channel. FIG. 9 illustrates how this works. All the ET signals are preempted before the working traffic on service one (1) can be switched from the working wavelength ($\lambda_1$), to the protection wavelength ($\lambda_3$).

Dual Ring Inter-working (DRI)

When two rings are interconnected, Dual Ring Inter-working prevents single points of failure by interconnecting the rings at two nodes. The drop and continue feature, in combination with path selectors/service selectors, enables the DRI protection service. A DRI service can only be combined with an OCh/DPRing or OCh/SPRing service.

Through DRI, two optical rings can be interconnected together at two DRI nodes. Ring interworking is a network topology whereby two rings are interconnected at two nodes on each ring, and the topology operates such that a failure at either of these two nodes will not cause loss of any working traffic. Within each of those two nodes, there are two co-located nodes that reside on two different rings and are interconnected.

FIG. 26 illustrates an example on how DRI works within the context of two interconnected OCh/SPRING rings. P1 and S2 form one DRI node, and S1 and P2 form another DRI node. These two DRI nodes are common to both rings. Nodes that ride on the same ring can be further distinguished as P (Primary node) and S (Secondary node), such as P1/S1 and P2/S2. When a traffic demand arrives at the DRI node represented by P1 and S2, the node performs a "Drop and Continue" function. That is, it will drop a copy of the traffic to the bottom ring, and continue a copy of the traffic to the other DRI node represented by S1 and P2. At S1, traffic will be dropped again to the bottom ring. As there are two copies of the traffic, one coming from P1-S2-P2, and the other coming from P1-S1-P2, the Service Selector (SS) located at P2 will select a copy of the traffic to continue to the rest of the bottom ring.

If a failure occurs that affects the primary connection, the Service Selector will detect the failure and switch to the secondary connection, and vice versa. The fundamental design objective for the DRI is that a failure in one ring should have no impact on the other ring.

DRI architectures can provide ring Interworking between two rings that employ OCh/SPRing protection, two rings that employ OCh/DPRing protection, or one ring that employs OCh/SPRing protection and one ring that employs OCh/DPRing.

There are two routing options associated with ring inter-working using DRI: same-side routing vs. opposite-side routing. Same-side routing is illustrated in FIG. 26, while opposite-side routing is illustrated in FIG. 27. Note that same-side routing requires two extra, or secondary circuits, i.e., one per ring, for dual node interworking (see FIG. 26), while opposite-side routing requires only one extra, or secondary circuit (see FIG. 27). In the bottom ring of FIG. 27, the traffic already passes through both the primary and secondary nodes for opposite-side ring interworking; this is known as the service circuit. For opposite-side routing, extra bandwidth for a secondary circuit is only used in one ring (e.g., the top ring in FIG. 27).

DRI of OCh/SPRing with OCh/SPRing

FIG. 27 illustrates the architecture of OCh/SPRing interworking. For the unidirectional signal transmitted from the node A, the primary node dual feeds that signal both towards its own interface and towards the multiplex section to the secondary node. This function is often referred to as drop-and-continue. In the other direction, the primary node selects, via a service selector, between the hand-offs to the primary and secondary nodes from the other ring, and transmits that selection to the upper terminating node. This function is often referred to as drop-and-continue. In the other direction, the primary node selects, via a service selector, between the hand-offs to the primary and secondary nodes from the other ring, and transmits that selection to the upper terminating node. FIGS. 28-31 show example failure cases for the interworking between two rings that employ OCh/SPRing protection.

DRI of OCh/SPRing with OCh/DPRing

FIG. 32 illustrates the architecture of the dual ring interworking between OCh/SPRing and OCh/DPRing. The top ring is OCh/SPRing. The bottom ring is OCh/DPRing. For unidirectional signal transmitted from the source node on the top ring, the primary interconnection node on the top ring performs "drop and continue". The upper secondary interconnection node drops the continued copy of the traffic to the lower OCh/DPRing. The copy of the traffic dropped from the upper primary interconnection node reaches the lower primary interconnection node and continue on in one fiber in counter clock-wise direction to the destination node. The copy of the traffic dropped from the upper secondary node reaches the lower secondary interconnection node and continue on in another fiber in clock-wise direction to the destination node. The destination node selects from one of these two traffic signals.

For unidirectional traffic transmitted from the source node on the bottom ring, the signal transmits in both directions along two fibers since it is an OCh/DPRing. When the signal reaches the low secondary interconnection node, it performs "drop and continue", that is, dropping a copy of the traffic to the upper OCh/SPRing, and continues a copy of the traffic to the low primary interconnection node. The low primary interconnection selects from one of the two copies of the traffic (the other copy comes from the source node), and drops it to the upper primary interconnection node. The upper primary interconnection node selects one of the two copies of the traffic (one comes from the upper secondary interconnection node, one dropped from the lower primary interconnection node), and then transmits the traffic to the destination node.

DRI of OCh/DPRing with OCh/DPRing

FIG. 33 shows the architecture of OCh/DPRing ring interworking. For each direction of transmission, the signal is dual-fed from the source node around both sides of the ring. When each of the dual-fed signals hits an interconnection node, it is dropped at that node and continued onto the other interconnection node using the drop-and-continue feature. Thus, each interconnection node can select from two signals sent on a different way around the ring. The output of the selector in each interconnection node is then transmitted to the second ring. Each of the interconnection nodes in the second ring takes its respective signal and transmits it towards the sink node, away from the other interconnection node. Finally, the sink node makes the selection between the two signals from the two directions around the ring. Due to the symmetry of this scheme, the two interconnection nodes are completely equivalent.

Some examples of reconfiguration in case of failure are shown in FIGS. 34-39:

FIG. 34 shows a bi-directional span failure in one ring;
FIG. 35 shows a bi-directional failure of one interconnection link;
FIG. 36 shows a nodal failure at one interconnection point;
FIG. 37 shows a bi-directional failure between interconnecting nodes on the same ring;
FIG. 38 and FIG. 39 show unidirectional failures in each direction assuming unidirectional working of OCh/DPRing.

Link and Node Disjoint Paths

The link-and-node disjoint paths refer to two lightpaths on a ring, with the same source and destination nodes but not sharing any other nodes or links. This option is required to support applications that do not require optical layer protection/restoration but only the assurance that traffic flowing between source node A and destination node B uses (at least 2) circuits that are disjoint. By doing so in case one of them fails, the traffic can still survive by over-flowing to the other path. For example, this approach can provide path diversity in data applications over optical rings. Moreover it is required to make sure that the provisioned paths that are disjoint at the application layer are effectively disjoint from the underlying optical layer.

FIG. 10 illustrates the concept of the unprotected/link-and-node disjoint paths. Two disjoint paths are setup simultaneously between the nodes A and C. One path goes from A-B-C, the other A-D-C. In case one path fails, the traffic can overflow to the other path.

In terms of the wavelength assignment, these two disjoint lightpaths can use the same wavelength, or different wavelengths. For example, in terms of unprotected (e.g., data) applications on the ring, this is unprotected/non-pre-emptable traffic.

A Mix & Match Optical Channel Ring Protection Architecture

The embodiments herein are capable of supporting the following optical channel protection mechanisms in the same physical ring, on a per Optical Channel basis.

1. Unprotected channels
2. 1+1 or 1:1-OCh/DPRing protected channels
3. OCh/SPRing protected channels
4. Link-and-Node path disjoint channels
5. Extra traffic channels This mix & match architecture is possible because each node (a flexible Optical Add-Drop Multiplexer (OADM)) in the optical ring uses combinations of components called Transponders or TRPs that can provide either electrical or optical switching of input signals, and optical switching components called Optical Switching Fabric or OSF, as explained below.

When the TRPs implement electrical switching of input signals we will refer to the "electrical embodiment" of the mix & match optical ring protection architecture.

When the TRPs implement optical switching of input signals we will refer to the "optical embodiment" of the mix & match optical ring protection architecture.

U.S. patent application Ser. No. 10/099,890, filed Mar. 15, 2002 by the same assignee and entitled "Method And Apparatus For Interconnecting A Plurality Of Optical Transducers With A Wavelength Division Multiplexed Optical Switch" discloses the details regarding a flexible OADM, and is hereby incorporated by reference as if repeated herein in its entirety, including the drawings.

Each node in the ring is a flexible OADM, which means that is capable of adding/dropping individual wavelengths out of the total wavelengths transported in the ring. Which wavelength each node in the ring adds, drops or passes through is completely programmable by software. This is accomplished by an Optical Switching Fabric (OSF) element that provides per-wavelength switching.

Moreover, each node has Transponder (TRP) cards that provide user interfaces (where external equipment, such as IP routers and ATM switches, is connected to the ring) and provide either electrical or optical switching of input signals. In the electrical embodiment TRPs are installed in pairs according to different configurations, and implement electrical switching of input signals (e.g., bridge and select functions) In the optical embodiment, each TRP implement optical switching of input signals—optical bridge/splitter for 1+1-OCh/DPRing, optical switch at the head-end and tail-end for 1:1-OCh/DPRing and OCh/SPRING.

Implementation of OCh/DPRing

Some of the embodiments herein implement OCh/DPRing. If one of the failure conditions (Loss of Signal, Loss of Frame, Signal Failure) is detected in the received line signal, the traffic will be automatically switched to the second received signal. In the non-revertive case, traffic will not switch back to the first received signal even if the failure condition affecting it clears. Also by "non-revertive," it is meant that the protection path now becomes the working path where the traffic is riding on, and the original working path now becomes the protection path. After fault is cleared, the traffic will stay the way it is now rather than switch back to its original then working path (now protection path). In the revertive case, traffic will switch back to the first received signal when the failure condition affecting it clears.

This embodiment of OCh/DPRing does not require any optical switching at the OSF; the TRP cards implement all the required protection functionality.

In terms of the TRP cards configuration, TRP electrical or optical switching supports OCh-DPRing by implementing both the Bridge (Br) and Select (Sel) functions. FIG. 12A shows the TRP cards configurations in the electrical embodiment for two OCh/DPRing services; one service configured using $\lambda_1$ for working and protection services, the other using $\lambda_3$.

In the electrical embodiment, due to the fact that the head-end bridge is done at electrical level, the working path and protection path need not to use the same wavelength. However, taking into considerations of operational concerns, one should use the same wavelength whenever it is possible.

FIG. 12B shows the TRP card configurations in the optical embodiment for two 1+1 or 1:1-OCh/DPRing services. In the 1+1 case the optical switching function in the TRPs must implement an optical bridge at the head-end and an optical switch at the tail end, while in the 1:1 case the optical switching function in the TRPs switched the signal at source and destination only in the event of a protection switch.

Implementation of OCh/SPRing

FIG. 13 illustrates the wavelength configuration of a node, specifically for OCh/SPRing. Assuming that only OCh/SPRing traffic is carried on a ring, half of the bandwidth on the ring is reserved for "protection" which can carry low-priority Extra Traffic.

In the electrical embodiment, the implementation of OCh/SPRing uses combinations of optical switching at OSF and electrical switching at TRPs. In the optical embodiment, the implementation of OCh/SPRing uses a combination of optical switching at the OSF and at the TRPs.

The OSF element at each node is configured (e.g., by the O-APS protocol) to change the state of each wavelength involved in the protection switching event, from add/drop to through or vice versa. For example, in FIG. 7, the OSF element at nodes A and D must be configured to add/drop $\lambda_3$ (the protection wavelength that now will carry lightpath one (1) due to the ring switch), while the OSF element at nodes E and F must be configured to pass through $\lambda_3$.

In terms of the TRP cards configuration, TRP optical or electrical switching supports OCh/SPRing by implementing both the Bridge (Br) and Select (Sel) functions. FIG. 14A shows the TRP cards configurations in the electrical embodiment for two OCh/SPRing protected services; both services configured using $\lambda_1$ for working channels, and $\lambda_3$ for protection channels. Extra traffic can be provisioned on the protection wavelength.

FIG. 14B shows the TRP card configurations in the optical embodiment for two OCh/SPRing protected services.

OCh/SPRing is different from the OCh/DPRing in the following ways:

In OCh/DPRing, the protection resource is dedicated. In OCh/SPRing, the protection resources could be shared. In addition, in the electrical embodiment, extra traffic (unprotected, pre-emptable traffic) can be provisioned on the protection channel under normal condition.

OCh/DPRing does not require a signaling protocol whereas OCh/SPRing requires a signal protocol to coordinate the switching from the working channel to the protection channel between the source and destination nodes.

OCh/DPRing is unidirectional whereas OCh/SPRing is bi-directional.

In 1+1-OCh/DPRing, since the source node does permanent bridging, the destination node needs to switch from the one signal to another upon the detection of failure of one signal. Switching may be revertive or non-revertive. In 1:1-OCh/DPRING and OCh/SPRing, the source and destination nodes coordinate to switch from the working channel to protection channel upon the detection of failure. Once the failure recovers, OCh/SPRing is revertive, i.e., it needs to switch back from the protection channel to the working channel.

To support OCh/SPRing and 1:1-OCh/DPRING protection switching, a signaling protocol that coordinates the switching actions between the source and destination nodes is needed. If extra traffic is provisioned on the protection channel, they have to be preempted before the working channel can be switched to the protection channel.

Implementation of Link and Node Disjoint and Unprotected Services

In the embodiments herein, link-and-node disjoint services and unprotected services require neither optical switching nor electrical switching. What is required for link-and-node disjoint services is that each lightpath for each of the services in the pair travels around the ring in opposite directions, and does not traverse the same set of intermediate nodes.

In terms of the TRP cards configuration, TRP optical or electrical switching does not implement Bridge and Select functions.

FIG. 15 illustrates the TRP card configuration in the electrical or optical embodiment for four unprotected services, using wavelength $\lambda_1$, $\lambda_2$, $\lambda_3$ and $\lambda_4$.

Implementation of Extra Traffic

The proposed implementation of Extra Traffic uses a combination of optical switching and electrical switching.

The OSF element at each node is configured (e.g., by the O-APS protocol) to change the state of each wavelength involved in the protection switching event, from add/drop to through or vice versa. For example, in FIG. 9, the OSF element at nodes A and D must be configured to add/drop $\lambda_3$ (the protection wavelength that now will carry lightpath one (1) due to the ring switch) to the appropriate ports, while the OSF element at node F must be configured to pass through $\lambda_3$.

FIG. 16 shows the TRP configurations for the OCh/SPRing and extra traffic. Two OCh/SPRing protected services (disjoint) are configured using $\lambda_1$ as working channel, $\lambda_3$ as protection channel. Two ET are provisioned on the protection channel using protection wavelength $\lambda_3$.

The embodiments here allow supporting multiple optical channel protection mechanisms on the same physical ring.

Going beyond traditional capabilities found in SONET/SDH and existing optical rings, the embodiments can support multiple ring protection mechanisms—OCh/DPRing (Optical Channel Dedicated Protection Ring), OCh/SPRing (Optical Channel Shared Protection Ring) with optional support for extra traffic, unprotected channels, and even channel pairs that use node-and-link disjoint paths—all selectable on a per-wavelength basis. This architecture also supports resilient ring interconnection via so-called "dual ring inter-working" (DRI) and resilient mesh-ring inter-working.

This capability effectively translates into a palette of service levels that a carrier can offer to customers, selectable on a per-wavelength basis, over the same physical optical ring.

The embodiments make possible the following:

1. An architecture (mix & match optical channel ring protection architecture) that allows mixing different optical channel ring protection schemes in the same ring.

2. The mix & match optical channel ring protection architecture allows to select, per service, what protection scheme will be applied.

3. The mix & match optical channel ring protection architecture allows service providers and carriers to provide, in the same physical ring, a palette of service options that include: unprotected, link-and-node disjoint paths, extra traffic, shared protection, dedicated protection.

4. An implementation of the mix & match optical channel ring protection architecture that employs only optical switching elements at each node in the ring, 5. An implementation of the mix & match optical channel ring protection architecture that combines optical switching elements and electrical switching elements at each node in the ring.

Benefits of Mix & Match Optical Channel Ring Protection

There are usually two objectives to consider when selecting protection schemes. The first one is performance, or protection speed and reliability to be more specific. The second one is cost, which normally measured by bandwidth efficiency. In terms of performance, 1+1-OCh/DPRing is clearly better as it needs no signaling and minimum switching. In terms of cost, there is the perception that OCh/SPRing is less expensive as it allows multiple demands share wavelengths and therefore saves bandwidth. This perception may be true in many cases. But it is certainly not always true. The correct answer depends on the underlying traffic pattern. Actually there are many cases in which OCh/DPRing is more bandwidth efficient. The purpose of this section is to identify in what circumstances OCh/DPRing is more economical and in what circumstances OCh/SPRing is more economical.

It can be mathematically proved that OCh/DPRing is more efficient for the following two traffic patterns:

Hub traffic

Cross traffic

We will first give definitions of hub traffic and cross traffic. We then will use examples, instead of mathematical proofs, to demonstrate the above claims.

Hub traffic refers to the traffic pattern in which all demands go from their distinctive source nodes to a common node called the hub node. The hub traffic pattern is most common in access networks. FIG. 18 illustrates a hub traffic pattern where the hub node is node one (1). There are five traffic demands, each a unit wavelength, all going from their source (nodes three (3) to seven (7), respectively) to the hub node.

For this type of traffic patterns, OCh/DPRing is the optimal choice. By definition, OCh/DPRing uses a dedicated protection path. Using OCh/DPRing, routing is simple: The service path goes one way and its protection path goes the other way. The two paths form a whole ring. So each demand in FIG. 18 occupies an entire wavelength ring. Therefore, the five demands will consume a total of five wavelengths under OCh/DPRing.

On the other hand, if we use OCh/SPRing to protect the same five demands in FIG. 18: Hubbed Traffic Demands, we will end up using a total of six wavelengths. In this example at most two demands can share an OCh/SPRing wavelength because all demands share the hub as their common end points. This results in three OCh/SPRing wavelengths. Plus the three protection wavelengths make the total wavelengths consumed to be six. One may observe that in this particular case OCh/DPRing saves one wavelength because the number of demand is odd. This is indeed true if we assume all the demands are in the same size. When demands vary in size and when a demand is not allowed to split (i.e., has to follow the same route), OCh/DPRing has more potential to save.

Cross traffic refers to two or more traffic demands that cross each other. To be more precise, two demands are called cross demands if we want to go from one end of a demand to the other end of the demand, we have to pass one of the end points of the other demand no matter which way we go. An example of two crossing demands is shown in FIG. 19, where demand one is between node one (1) and node five (5), and demand two is between node four (4) and node eight (8). If we use OCh/DPRing for protection, we would need only two (2) wavelengths, one for each demand. If we use OCh/SPRing on the other hand, we would need four (4) wavelengths for the two demands, two working demands and two protection demands, since they are not disjoint and therefore cannot share the same wavelength for the working and protection.

Except in cases of hub traffic and cross traffic where OCh/DPRing has a clear advantage over OCh/SPRing, OCh/SPRing in general is more efficient than OCh/DPRing. One extreme example to show OCh/SPRing advantage over OCh/DPRing is in the case of adjacent traffic demands as shown in FIG. 18. Adjacent traffic refers to the traffic demand that goes from one node of the ring to its neighboring node. In FIG. 20, eight adjacent traffic demands are shown in the eight-node ring. If we use OCh/SPRing, we would need only two wavelengths (one for working, and one for protection) for all eight demands, because these eight demands can be routed completely disjoint. If we use OCh/DPRing on the other hand, we would need eight wavelengths, one for each demand. In this particular case, OCh/SPRing represents four fold savings over the OCh/DPRing.

Using Mix and Match Protection Scheme on the Same Ring

As discussed in the above section, different protection schemes are best suited for different traffic demands. To take full advantage of the ability of ODN rings to support a mix and match of protection schemes on the same physical ring, we can adopt the following approach in order to achieve maximum bandwidth efficiency: we can first subdivide the total demands into different protection groups based on their traffic pattern and characteristics. Then for each of the protection groups, we can choose the appropriate protection schemes independently. We will use the following example to demonstrate the approach.

FIG. 21 shows an eight-node ring with completely fully meshed traffic demands. By fully meshed, we mean that from there is a traffic demand from any one node of ring to any other node of the ring. A total of twenty-eight traffic demands are shown. We can divide these twenty-eight traffic demands into four different protection groups, as illustrated in FIGS. 23-25, respectively. OCh/SPRing can be selected for the first three protection groups, and OCh/DPRing can be selected for the last protection group.

Terminology

Add traffic: Traffic inserted into working, protection, or non-preemptible unprotected channels on the ring at a ring node.

Bi-directional protection switching: A protection switching architecture in which, for a unidirectional failure (i.e., a failure affecting only one direction of the transmission), both directions including the affected direction and the unaffected direction, are switched to the protection.

Bi-directional ring: In a bi-directional ring, normal routing of the normal traffic signals is such that both directions of a bi-directional connection travel along the ring through the same nodes, but in opposite directions.

Bridge: The action of transmitting identical traffic on both the working and protection channels.

Drop and continue: When traffic is allowed to be dropped at more than one node, it is said to be dropped and continued at all terminating nodes (i.e., nodes not provisioned to just pass through that traffic) between the node inserting the traffic and the last node terminating the traffic. This feature can be used to support broadcast services and dual access for inter-ring traffic.

Drop traffic: Traffic extracted from working, protection, or non-preemptible unprotected channels on the ring at a ring node.

Extra traffic: Traffic that is carried over the protection channels when that capacity is not used for the protection of working traffic. Extra traffic is not protected. Whenever the protection channels are required to protect the working traffic, the extra traffic is pre-empted.

Lightpath: An end-to-end connection between two optical nodes. Lightpath is used as a synonym of service in the context of this document.

Non-revertive: A protection switching scheme in which once the working traffic is switched to the protection channels (under a failure condition), it stays on the protection channels even if the failure condition recovers.

Pass-through: The action of transmitting the same information that is being received for any direction of transmission.

Protection channels: The channels allocated to transport the protected traffic during a switch event. Protection channels may be used to carry extra traffic in the absence of a switch event. When there is a switch event, the protected traffic on the affected working channels is bridged/switched onto the protection channels.

Revertive: A protection-switching scheme in which the working traffic is switched to the protection channels under a failure condition. Once the failure condition recovers, the working traffic will be switched back to the working channels.

Ring interworking: A network topology where two rings are connected at two points and operate such that failure at either of these two points will not cause loss of any traffic, except possibly that dropped or inserted at the point of failure.

Switch: The action of selecting normal traffic from the protection channels rather than the working channels.

Unidirectional protection switching: In unidirectional protection switching, for a unidirectional failure (i.e., a failure affecting only one direction of transmission), only the affected direction is switched to the protection.

Unidirectional ring: In a unidirectional ring, normal routing of the signal is such that both directions of bi-directional connection travel around the ring in the same direction (e.g. clockwise). Specifically, each bi-directional connection uses capacity along the entire circumference of the ring.

Working channels: The channels over which protected traffic is transported when there are no switch events.

Working traffic: traffic that is normally carried in the working channels, except in the event of a protection switch, in which case it is restored on the protection channels. The working traffic is also called protected traffic in the context of this document.

In addition to the above, the following should be noted:

"Optically Switched" transponders (TRPs) can be used for either 1:1-OCh/DPRing or OCh/SPRing "Optically Switched" TRPs (i.e., the "optical embodiment") do not offer protection to transponder failures (while the "electrical embodiment" does). Both embodiments offer protection to network link failures In the "optical embodiment" working and protect wavelength assignments is reversed on clockwise vs. counter-clockwise fibers (working in one direction is protect in the other). Optical Implementation in the TRP pair either (1) "directs" the wavelengths in either normal, "working" direction, or in opposite direction around the ring away from a failed line for 1:1-OCh/DPRING or OCh/SPRING, or (2) optically bridges the signal in both directions for 1+1-DPRING, AND implements the selector function optically.

In the "optical embodiment" the Optical Supervisory Channel (OSC) is used for O-APS signaling in both 1:1-OCh/DPRing and OCh/SPRing.

Although various embodiments are specifically illustrated and described herein, it will be appreciated that modifications and variations of the invention are covered by the above teachings and are within the purview of the appended claims without departing from the spirit and intended scope of the invention. For example, certain types of optical networks are described in conjunction with the present invention, however, other types may be appropriate for the present invention. Furthermore, these examples should not be interpreted to limit the modifications and variations of the invention covered by the claims but are merely illustrative of possible variations.

What is claimed is:

1. A method for providing protection switching in an optical ring network, including a plurality of optical nodes, each of which has a flexible optical add drop multiplexer capable of selectively switching individual wavelengths, said method comprising:

(a) providing a first optical channel ring protection scheme for a first group of channels in the optical ring network;

(b) providing a second optical channel ring protection scheme for a second group of channels in the optical ring network, wherein step (b) is provided simultaneously with step (a); and (c) selecting on a per service basis either the first or the second optical channel ring protection scheme.

2. The method according to claim 1, wherein said first group of channels is independent of the second group of channels.

3. The method according to claim 1, wherein said first group of channels is associated with a first group of wavelengths used in the optical ring network and the second group of channels is associated with a second group of wavelengths used in the optical ring network.

4. The method according to claim 3, wherein the first group of wavelengths does not include any wavelengths in the second group of wavelengths.

5. The method according to claim 1, wherein the first optical channel ring protection scheme includes optical channel shared protection ring switching.

6. The method according to claim 1, wherein the first optical channel ring protection scheme includes optical channel dedicated protection ring switching.

7. The method according to claim 1, further comprising a mix and match optical channel ring protection architecture that allows service providers to provide, in the same physical ring, a palette of service options that include one or more of the following: unprotected, link-and-node disjoint paths, extra traffic, shared protection and dedicated protection.

8. The method according to claim 1, further comprising providing both electrical and optical switching capability in each of the plurality of optical nodes.

9. The method according to claim 1, further comprising a mix and match optical channel ring protection architecture that allows service providers to provide, in the same physical ring, a palette of service options that include one or more of the following: unprotected, link-and-node disjoint paths, extra traffic, shared protection and dedicated protection.

10. A method for providing protection switching in an optical network, including at least two optical rings, each optical ring including a plurality of optical nodes, each of which has a flexible optical add drop multiplexer capable of selectively switching individual wavelengths, said method comprising:

(a) providing a first optical channel ring protection scheme for a first group of channels in each of the at least two optical rings;

(b) providing a second optical channel ring protection scheme for a second group of channels in each of the at least two optical rings, wherein step (b) is provided simultaneously with step (a); and (c) selecting on a per service basis either the first or the second optical channel ring protection scheme.

11. The method according to claim 10, further comprising coupling together the two at least optical rings using two interconnected nodes on each of the at least two optical rings and operating the at least two optical rings using dual ring interworking.

12. The method according to claim 10, wherein said first group of channels is independent of the second group of channels.

13. The method according to claim 10, wherein said first group of channels is associated with a first group of wavelengths used in the optical ring network and the second group of channels is associated with a second group of wavelengths used in the optical ring network.

14. The method according to claim 13, wherein the first group of wavelengths does not include any wavelengths in the second group of wavelengths.

15. The method according to claim 10, wherein the first optical channel ring protection scheme includes optical channel shared protection ring switching.

16. The method according to claim 10, wherein the first optical channel ring protection scheme includes optical channel dedicated protection ring switching.

17. The method according to claim 10, further comprising a mix and match optical channel ring protection architecture that allows service providers to provide, in the same physical ring, a palette of service options that include one or more of the following: unprotected, link-and-node disjoint paths, extra traffic, shared protection and dedicated protection.

18. The method according to claim 10, further comprising providing both electrical and optical switching capability in each of the plurality of optical nodes.

19. The method according to claim 10, further comprising a mix and match optical channel ring protection architecture that allows service providers to provide, in the same physical ring, a palette of service options that include one or more of the following: unprotected, link-and-node disjoint paths, extra traffic, shared protection and dedicated protection.

* * * * *